United States Patent
Hamada et al.

[11] Patent Number: 5,833,552
[45] Date of Patent: Nov. 10, 1998

[54] GOLF BALL

[75] Inventors: Akihiko Hamada, Kakogawa; Kouhei Takemura, Nara, both of Japan

[73] Assignee: Sumitomo Rubber Industries, Ltd., Hyogo-ken, Japan

[21] Appl. No.: 785,509

[22] Filed: Jan. 17, 1997

[30] Foreign Application Priority Data

Jan. 18, 1996 [JP] Japan .................................. 8-026027
Feb. 16, 1996 [JP] Japan .................................. 8-053824
Feb. 16, 1996 [JP] Japan .................................. 8-053826
Feb. 16, 1996 [JP] Japan .................................. 8-053827

[51] Int. Cl.$^6$ .......................... A63B 37/06; A63B 37/14
[52] U.S. Cl. .......................... 473/359; 473/363; 473/365; 473/373; 473/377; 473/385
[58] Field of Search .................... 473/373, 359, 473/363, 365, 377, 385

[56] References Cited

U.S. PATENT DOCUMENTS 5,553,852  9/1996  Higuchi et al. ...................... 473/373
5,674,137  10/1997  Maruko et al. ...................... 473/361 X

*Primary Examiner*—George J. Marlo
*Attorney, Agent, or Firm*—Birch, Stewart, Kolasch & Birch, LLP

[57] ABSTRACT

The present invention provides a golf ball having good shot feel and controllability and showing excellent rebound characteristics to give long flight distance. The golf ball of the present invention includes a core and a cover present on the core, an intermediate layer optionally being present between the core and the cover, wherein at least one layer of the cover or the intermediate layer has a thickness of 1 to 3 mm and is formed from a composition having an elasticity modulus (E*) at −30° to +20° C. of 1,000 to 9,000 Kgf/cm$^2$ and a loss tangent at −30° to +20° C. of 0.02 to 0.1., and the core, whether solid core or thread wound core, has a spring constant at compression deformation of 15 to 60 Kgf/mm. The present invention also provides in another embodiment a three piece solid golf ball which includes a solid core, an intermediate layer formed on the solid core and a cover covering the intermediate layer, wherein the cover is formed from a mixture of an ionomer resin and a diene rubber, has a thickness of 1 to 3 mm, and is formed from a cover composition having an elasticity modulus (E*) at −30° to +20° C. of 1,000 to 9,000 Kgf/cm$^2$ and a loss tangent at −30° to +20° C. of 0.02 to 0.1; the intermediate layer has a thickness of 1 to 3 mm and is formed from a resin composition having an elasticity modulus (E*) at −30° to +20° C. of 5,000 to 20,000 kgf/cm$^2$ and a loss tangent at −30° to +20° C. of 0.15 or less, the minimum value of the elasticity modulus of the intermediate layer being larger than that of the cover; and the solid core has a diameter of 30.7 to 38.7 mm and a spring constant at compression deformation of 20 to 55 Kgf/mm.

15 Claims, 4 Drawing Sheets

GOLF BALL

FIELD OF THE INVENTION

The present invention relates to a golf ball. More particularly, it relates to a golf ball having excellent controllability and good shot feel as well as long flight distance.

BACKGROUND OF THE INVENTION

There have been two types of golf balls commercially available, of which one is a solid golf ball, for example a two piece solid golf ball comprised of a core formed from a molded rubber article and a cover, covering the core, formed from a thermoplastic resin such as an ionomer resin. The other is a thread wound golf ball which comprises a solid or liquid center on which thread rubber is wound and a cover covering on the thread rubber layer and having a thickness of 1 to 2 mm, formed from ionomer resin or balata.

The conventional golf balls, whether solid golf ball or thread wound golf ball, have defects to be improved. For example, the solid golf ball has long flight distance, but has poor shot feel and poor controllability. The thread wound golf ball adversely has good in shot feel and controllability, but has shorter flight distance.

Much effort has been made on either type of golf balls for improving the defects, but no golf ball having sufficient performance has been obtained.

OBJECT OF THE INVENTION

Accordingly, an object of the present invention is to provide a golf ball being good in shot feel and controllability and showing excellent rebound characteristics to give long flight distance.

SUMMARY OF THE INVENTION

The present inventors have intensively studied to solve the above problems and have found that the rebound characteristics have a relation to the loss tangent (tan $\delta$) of a cover composition and that the spin amount and shot feel are related to a spring constant (a force necessary for giving a unit deformation to a spring) of a core and an elasticity modulus (E*) of the cover composition. When these parameters are controlled to a suitable range, the golf ball is excellent in shot feel and controllability and shows excellent rebound characteristics to give a longer flight distance.

Accordingly, the present invention provides a golf ball comprising a core and a cover present on the core, an intermediate layer optionally being present between the core and the cover, wherein at least one layer of the cover or the intermediate layer has a thickness of 1 to 3 mm and is formed from a composition having an elasticity modulus (E*) at $-30°$ to $+20°$ C. of 1000 to 9,000 Kgf/cm$_2$ and a loss tangent at $-30°$ to $+20°$ C. of 0.02 to 0.1, the core, whether solid core or thread wound core, has a spring constant at compression deformation of 15 to 60 Kgf/mm.

Particularly, the present invention provides a thread wound golf ball comprising a thread wound core and a cover covering the thread wound core, wherein the cover has a thickness of 1 to 3 mm and is formed from a cover composition having an elasticity modulus (E*) at $-30°$ to $+20°$ C. of 1000 to 9,000 Kgf/cm$^2$ and a loss tangent at $-30°$ to $+20°$ C. of 0.02 to 0.09, the thread wound core has a spring constant at compression deformation of 15 to 60 Kgf/mm.

Also, the present invention provides a two piece solid golf ball comprising a solid cover a cover covering the solid core, wherein the cover has a thickness of 1 to 3 mm and is formed from a cover composition having an elasticity modulus (E*) at $-30°$ to $+20°$ C. of 1000 to 9,000 Kgf/cm$_2$ and a loss tangent at $-30°$ to $+20°$ C. of 0.02 to 0.1, the solid core has a diameter of 36.7 to 40.7 mm and a spring constant at compression deformation of 20 to 60 Kgf/mm.

Further, the present invention provides a three piece solid golf ball comprising a solid core, an intermediate layer formed on the solid core and a cover covering the intermediate layer, wherein the cover has a thickness of 1 to 3 mm and is formed from a cover composition having an elasticity modulus (E*) at $-30°$ to $+20°$ C. of 1000 to 9,000 Kgf/cm$^2$ and a loss tangent at $-30°$ to $+20°$ C. of 0.02 to 0.1, the intermediate layer has a thickness of 1 to 3 mm and is formed from a resin composition having an elasticity modulus (E*) at $-30°$ to $+20°$ C. of 5,000 to 20,000 Kgf/cm$^2$ and a loss tangent at $-30°$ to $+20°$ C. of 0.15 or less, the minimum value of the elasticity modulus of the intermediate layer being larger than that of the cover, the solid core has a diameter of 30.7 to 37.7 mm and a spring constant at compression deformation of 20 to 55 Kgf/mm.

Furthermore, the present invention provides a three piece solid golf ball comprising a solid core, an intermediate layer formed on the solid core and a cover covering the intermediate layer, wherein the cover has a thickness of 1 to 3 mm and is formed from a resin composition having an elasticity modulus (E*) at $-30°$ to $+20°$ C. of 5,000 to 20,000 Kgf/cm$^2$ and a loss tangent at $-30°$ to $+20°$ C. of 0.15 or less, the intermediate layer has a thickness of 1 to 3 mm and is formed from a intermediate layer composition having an elasticity modulus (E*) at $-30°$ to $+20°$ C. of 1000 to 9,000 Kgf/cm$^2$ and a loss tangent at $-30°$ to $+20°$ C. of 0.02 to 0.1, the minimum value of the elasticity modulus of the intermediate layer being smaller than that of the cover, the solid core has a diameter of 30.7 to 37.7 mm and a spring constant at compression deformation of 20 to 55 Kgf/mm.

DETAILED DESCRIPTION OF THE INVENTION

Figure 1:
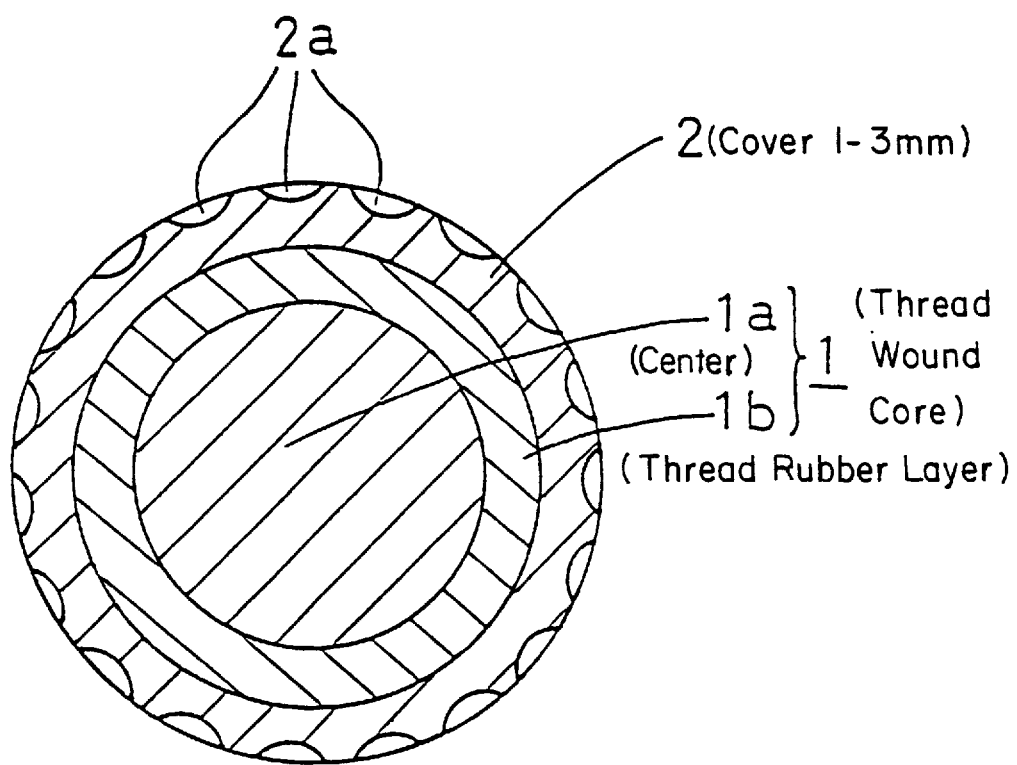

Firstly the terms "loss tangent (tan $\delta$)", "elasticity modulus (E*)", "spring constant" and "thickness" will be explained.

In the present invention, the term "loss tangent" is a value obtained from a measurement of dynamic viscoelasticity. The smaller the loss tangent, the higher the rebound characteristics. In other words, when the loss tangent (tan $\delta$) is small, loss of energy is small and the energy applied to a golf ball is almost changed to kinetic energy and the rebound characteristics are high and flight distance is long.

In the present invention, the loss tangent (tan $\delta$) at $-30°$ to $+20°$ C. of either the cover or the intermediate layer is required to be within the range of 0.02 to 0.1. If the loss tangent is within the above range, the resulting golf ball shows excellent rebound characteristics and also the composition for the core or intermediate layer is easily processed. If it is less than 0.02, the rebound characteristics increase more, but the processability of the composition is adversely affected and gives poor shot feel. If it is more than 0.1, the rebound characteristics is degraded and the flight distance is poor.

In the present invention, the elasticity modulus (E*) at −30° to +20° C. is also obtained from the measurement of dynamic viscoelasticity and should be limited to 1000 to 9,000 Kgf/cm², preferably 2,000 to 8,000 Kgf/cm². If the elasticity modulus is within the above range, the cover or intermediate layer has a suitable hardness and provides good controllability and shot feel. If it is less than 1000 Kgf/cm², the cover or intermediate layer is softened too much and the spin is applied too much and easily scratched on the surface. This also reduces the durability of the golf ball and makes the shot feel heavy. If it is more than 9,000 Kgf/cm², the rebound characteristics are enhanced, but the shot feel is poor and the controllability is also poor. The cover or intermediate layer is liable to be fragile, thus resulting in poor durability.

In the present invention, the temperature range for the loss tangent and elasticity modulus is controlled to the range of −30° to +20° C., because the rebound characteristics are related with the loss tangent or elasticity modulus in this temperature range. In addition, the loss tangent and elasticity modulus are determined by preparing a strip sample having a thickness of 2 mm, a width of 4 mm and a length of 30 mm from the composition for cover or intermediate layer and measuring a temperature dispersion of dynamic loss tangent and dynamic elasticity modulus using a modified viscoelasticity spectrometer DVE-200 available from Shimadz Seisakusho Co., Ltd. at the conditions that deformation mode is stretching, dynamic strain is 0.25%, temperature range is −100° to +70° C., and frequency is 10 Hz.

Further, in the present invention, the thickness of the cover or intermediate layer is limited to 1 to 3 mm. If it is more than 3 mm, the rebound characteristics decrease and the flight distance lowers. The shot feel is also poor. If it is less than 1 mm, the durability is poor and the resulting golf ball is difficult to use.

The core employed in the present invention can be either a thread wound core or a solid core, but should have a spring constant (a force necessary for giving a unit deformation to a spring) of 15 to 60 Kgf/mm, preferably 20 to 50 Kgf/mm to obtain easy application of spin and suitable rebound characteristics. If the spring constant is less than 20 Kgf/mm, the rebound characteristics decrease and the flight distance decreases. If it is more than 60 Kgf/mm, the golf ball is hard, thus resulting in poor shot feel, and the spin is also applied to much, thus resulting in poor flight distance.

In the present invention, the spring constant is determined from a gradient obtained by measuring a load at 1 mm compression deformation and a load at 3 mm compression deformation, using a deplacement-load tester.

Hereinafter is explaining a cover (or intermediate layer) material.

In order to make the cover (or intermediate layer) have the above dynamic viscoelasticity, it is made from a mixture thereof with an ionomer resin or a mixture of an ionomer resin and diene rubber. It may also be prepared from a thermoplastic elastomer having a soft segment which has a lower glass transition temperature.

Typical examples of the ionomer resins are Hi-milan 1605 (ethylene-methacrylic acid copolymer ionomer neutralized with sodium ion), Hi-milan 1707 (ethylene-methacrylic acid copolymer ionomer neutralized with sodium ion), Hi-milan 1706 (ethylene-methacrylic acid copolymer ionomer neutralized with zinc ion), Hi-milan AM 7315 (ethylene-methacrylic acid copolymer ionomer resin neutralized with zinc ion), Hi-milan AM7317 (ethylene-methacrylic acid copolymer ionomer neutralized with zinc ion), Hi-milan 1555 (ethylene-methacrylic acid copolymer ionomer neutralized with sodium ion), Hi-milan 1557 (ethylene-methacrylic acid copolymer ionomer neutralized with zinc ion), Hi-milan 1855 (ethylene-butylacrylate-methacrylic acid terpolymer ionomer neutralized with zinc ion), Hi-milan 1856 (ethylene-butylacrylate-methacrylic acid terpolymer ionomer neutralized with sodium ion), all available from Mitsui Du Pont Polychemical Co., Ltd.; Iotec 7010 (ethylene-acrylic acid copolymer ionomer neutralized with zinc ion), Iotec 8000 (ethylene-acrylic acid copolymer ionomer neutralized with sodium ion), all available from Exxon Chemical Co.; Surlyn 7930 (ethylene-methacrylic acid copolymer ionomer neutralized with lithium), Surlyn AD8511 (ethylene-methacrylic acid copolymer ionomer neutralized with zinc ion), Surlynn AD 8512 (ethylene-methacrylic acid copolymer ionomer neutralized with sodium ion), all available from Du Pont Co.; and the like.

The diene rubber to be mixed with ionomer resin includes ethylene propylene diene rubber (EPDM), butadiene rubber (BR), isoprene rubber (IR), styrene butadiene rubber (SBR), acrylonitrile butadiene rubber (NBR) or the like. Among them, the rubber preferably has a glass transition temperature of less than −30° C. If the glass transition temperature is more than −30° C., the cover (or intermediate layer) may not satisfy the loss tangent range of less than 0.02 to 0.1, because the loss tangent (tan δ) generally has a maximum value at the point of the glass transition temperature.

A mixing rate of the ionomer resin and the diene rubber is not limited as long as the resulting cover or intermediate shows the above mentioned dynamic viscoelasticity and is also varied by the type of the ionomer resin and diene rubber. It can generally be 90:10 to 40:60, preferably 80:20 to 50:50 in a weight ratio of ionomer resin:diene rubber.

The mixture of the ionomer resin and diene rubber may be obtained using a closed type mixture, such as a kneader, a banbury mixer or an open mixer, such as an open roll. It can also be done by an extruder, to keep continuous treatment. Further, it may also be conducted by so-called dynamic vulcanization wherein rubber is vulcanized in resin.

The thermoplastic elastomer having a soft segment with a low glass transition temperature includes styrene-butadiene-styrene (SBS) elastomer, hydrogenated styrene-butadiene-styrene (SEBS) elastomer, an epoxy-modified one thereof, polyamide-polyether elastomer, polyester-polyether elastomer and the like. In the thermoplastic elastomer having a soft segment, the soft segment is generally constituted from polybutadiene chain, polyisoprene chain, polydimethylsiloxane chain, polyether chain, poly(butylene-ethylene)chain and the like.

The cover (or intermediate layer) may be obtained from the above mentioned composition, but the composition may further contain additives, such as a pigment (e.g. titanium oxide), a dispersant, an antioxidant, a UV absorber, a light stabilizer and the like. If necessary, an elastomer other than the above mentioned one may be added thereto.

The golf ball of the present invention has the following four different embodiments which will be explained.

(Thread wound golf ball)

The thread wound golf ball is generally composed of a thread wound core and a cover, wherein the cover has a thickness of 1 to 3 mm and is formed from a cover composition having an elasticity modulus (E*)

at −30° to +20° C. of 1000 to 9,000 Kgf/cm² and a loss tangent at −30° to +20° C. of 0.02 to 0.09, the thread wound core has a spring constant at compression deformation of 15 to 60 Kgf/mm.

The thread wound golf ball is explained with reference to FIG. 1 which is a sectional view schematically showing an example of the thread wound golf ball of the present invention. In FIG. 1, the number 1 shows a thread wound core which is composed of a center 1a and a thread rubber layer 1b. The thread rubber layer 1b is formed by winding thread rubber in a stretched condition around the center 1a. In the present invention, the thread core 1 has a spring constant at compression deformation of 16 to 60 Kgf/mm.

In FIG. 1, the number 2 shows a cover which is covered on the thread rubber layer 1b. The cover is formed from a cover composition which has an elasticity modulus (E*) at −30° to +20° C. of 1000 to 9,000 Kgf/cm² and has a loss tangent at −30° to +20° C. of 0.02 to 0.09. The surface of the cover 2 generally has suitable number of dimples 2a. The cover is formed from the above mentioned material which shows the above viscoelasticity.

The thread wound core, as mentioned above, has a spring constant of 16 to 60 Kgf/mm, preferably 24 to 50 Kgf/mm. The center of the thread wound core can be either a liquid center or a solid center. Thread rubber is also the one which has been conventionally used. The spring constant can be controlled by adjusting a stretching tension when the thread rubber is wound on the center.

(Two piece golf ball)

The two piece golf ball is composed of a solid core and a cover, wherein the cover has a thickness of 1 to 3 mm and is formed from a cover composition having an elasticity modulus (E*) at −30° to +20° C. of 1000 to 9,000 Kgf/cm² and a loss tangent at −30° to +20° C. of 0.02 to 0.1 and, the solid core has a diameter of 36.7 to 40.7 mm and a spring constant at compression deformation of 20 to 60 Kgf/mm.

Figure 2:
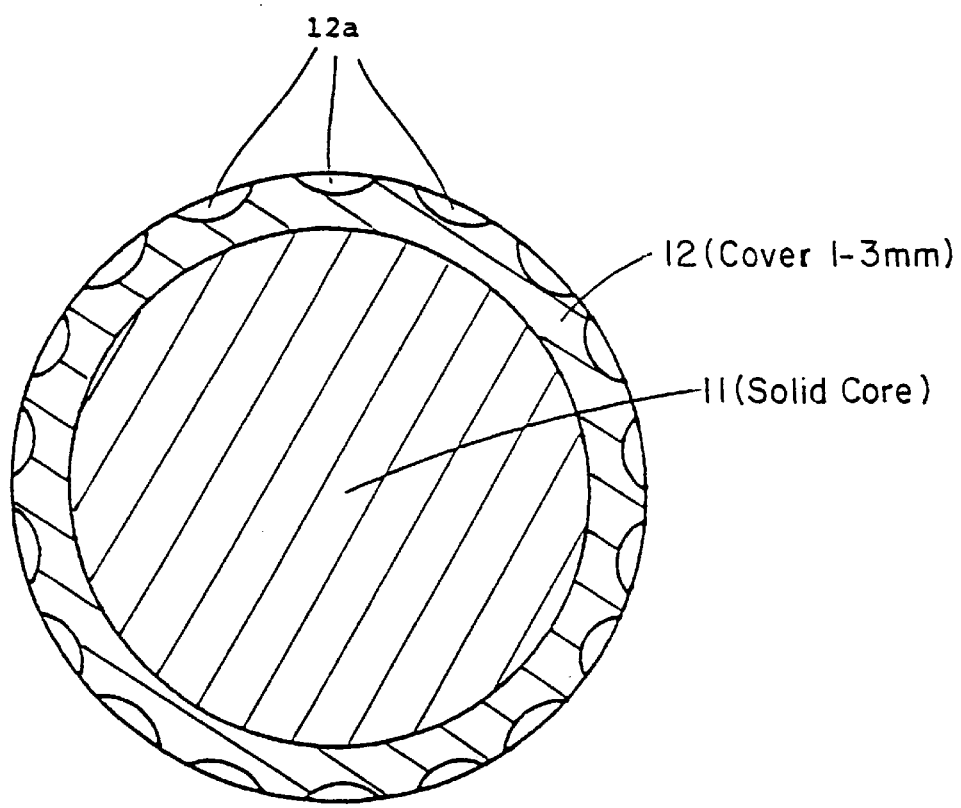

The two piece golf ball is explained with reference to FIG. 2 which is a cross-sectional view schematically showing an embodiment of the two piece golf ball of the present invention. In FIG. 2, the number 11 is a solid core and 12 is a cover on which some dimples 12a are formed.

In the present invention, the solid core 11 has a diameter of 36.7 to 40.7 mm and has a spring constant at compression deformation of 20 to 60 Kgf/mm.

The cover 12 covers the solid core 11 and has a thickness of 1 to 3 mm. It is formed from a cover composition having an elasticity modulus (E*) at −30° to +20° C. of 1000 to 9,000 Kgf/cm² and a loss tangent at −30° to +20° C. of 0.02 to 0.1. The surface of the cover 12 generally has suitable number of dimples 12a. If necessary, a paint layer or a marking is formed on the surface of the ball. The cover is formed from the above mentioned cover material.

The solid core can be made from any material, as long as the above mentioned spring constant is maintained, but is generally formed by vulcanizing a rubber composition which comprises a polybutadiene rubber, zinc acrylate as co-crosslinking agent and an organic peroxide. The specific rubber composition generally produces the core having the above mentioned spring constant range and having excellent durability.

(First three piece solid golf ball)

The first embodiment of the three piece solid golf ball of the present invention comprises a solid core, an intermediate layer formed on the solid core and a cover covering the intermediate layer, wherein the cover has a thickness of 1 to 3 mm and is formed from a cover composition having an elasticity modulus (E*) at −30° to +20° C. of 1000 to 9,000 Kgf/cm² and a loss tangent at −30° to +20° C. of 0.02 to 0.1, the intermediate layer has a thickness of 1 to 3 mm and is formed from a resin composition having an elasticity modulus (E*) at −30° to +20° C. of 5,000 to 20,000 Kgf/cm² and a loss tangent at −30° to +20° C. of 0.15 or less, the minimum value of the elasticity modulus of the intermediate layer being larger than that of the cover, the solid core has a diameter of 30.7 to 38.7 mm and a spring constant at compression deformation of 20 to 55 Kgf/mm.

Figure 3:
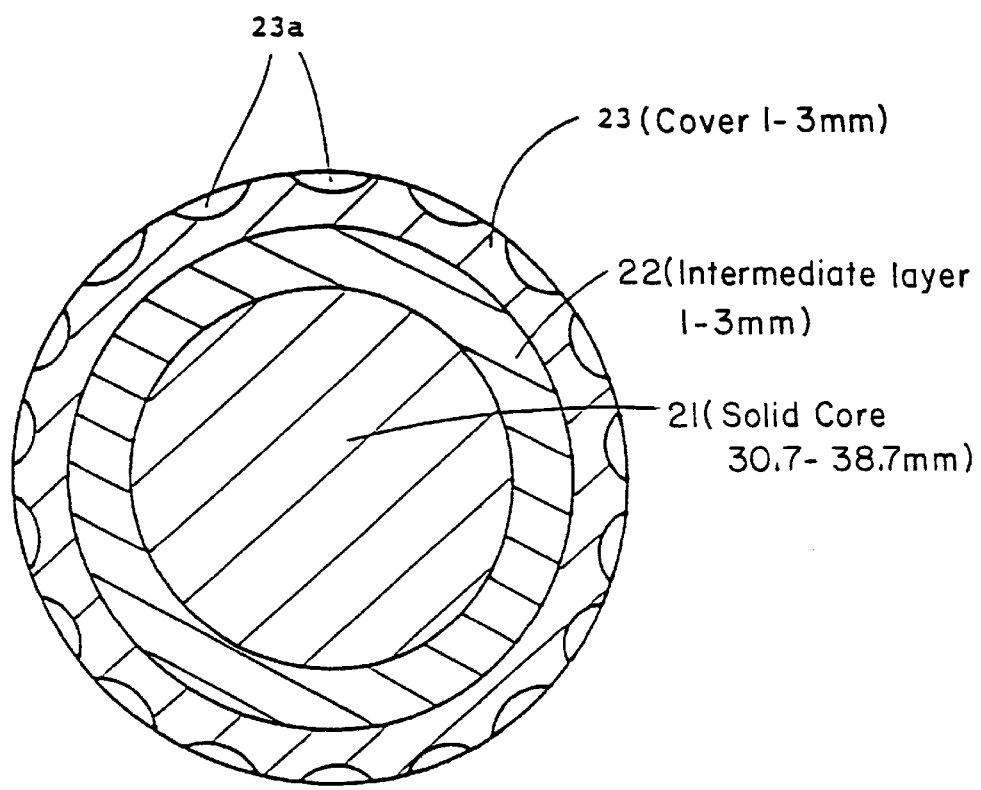

The first three piece solid golf ball is explained by using FIG. 3 which schematically shows a cross-section of one embodiment of the first three piece solid golf ball of the present invention. In FIG. 3, the number 21 shows a solid core, 22 is an intermediate layer and 23 is a cover on which some dimples 23a are present.

The solid core 21 has a diameter of 30.7 to 38.7 mm and a spring constant at compression deformation of 20 to 55 Kgf/mm.

The intermediate layer 22 is formed on the solid core 21 and has a thickness of 1 to 3 mm. It is formed from a resin composition having an elasticity modulus (E*) at −30° to +20° C. of 5,000 to 20,000 Kgf/cm² and a loss tangent at −30° to +20° C. of 0.15 or less, the minimum value of the elasticity modulus of the intermediate layer being larger than that of the cover.

The cover 23 is formed on the intermediate layer 22 and has a thickness of 1 to 3 mm. It is formed from a cover composition having an elasticity modulus (E*) at −30° to +20° C. of 1000 to 9,000 Kgf/cm² and a loss tangent at −30° to +20° C. of 0.02 to 0.1. The surface of the cover 23 generally has suitable number of dimples 12a. If necessary, a paint layer or a marking is formed on the surface of the ball. The cover is formed from the above mentioned cover material.

The intermediate layer is formed for enhancing the rebound characteristics of the golf ball and for inhibiting an excess deformation of the solid core to control the spin amount. In the present invention, the intermediate layer has a thickness of 1 to 3 mm and is formed from a resin composition having an elasticity modulus (E*) at −30° to +20° C. of 5,000 to 20,000 Kgf/cm² and a loss tangent at −30° to +20° C. of 0.15 or less, the minimum value of the elasticity modulus of the intermediate layer being larger than that of the cover. If the loss tangent of the intermediate layer is more than 0.15, suitable rebound characteristics are not obtained. The loss tangent of the intermediate layer can be small in view of the rebound characteristics, but if it is too small the processability is poor. Accordingly, the loss tangent is preferably more than 0.01. If the elasticity modulus is more than 20,000 Kgf/cm², the resulting golf ball is too hard and shows poor shot feel. If it is less than 5,000 Kgf/cm², the rebound characteristics lower and the flight distance is poor. It is also necessary that the minimum value of the elasticity modulus of the intermediate layer is larger than that of the cover. If not, the intermediate layer is softer than the cover and the desired controllability (spin performance) is not obtained.

In the present invention, the intermediate layer has a thickness of 1 to 3 mm. If the thickness is larger than 3 mm, the ball is hard enough to make shot feel poor. If it is less than 1 mm, the rebound characteristics decrease and the flight distance reduces.

The solid core used in combination with the cover and the intermediate layer has a spring constant of 20 to 55 Kgf/mm, preferably 22 to 50 Kgf/mm, to obtain the easy application of spin and suitable rebound characteristics. If the spring constant is less than 20 Kgf/mm, the rebound characteristics decrease and the flight distance reduces. If it is more than 55 Kgf/mm, the ball is too hard and the deformation at hitting is small, thus being difficult to apply spin on the golf ball and poor in controllability.

In the present invention, the solid core has a diameter of 30.7 to 38.7 mm. This is because the lower limit of a golf ball regulated by R & A is 42.7 mm, and the thickness of the cover and intermediate layer is respectively 1 to 3 mm. If the diameter of the core is less than 30.7 mm, the cover or intermediate layer is made thick and the defects therefrom arise. If it is more than 38.7 mm, the thickness of the cover or intermediate layer is too thin and the defects therefrom arise therefrom.

The intermediate layer can be made from any materials as long as it has the above mentioned viscoelasticity, but generally is formed from ionomer resin explained for the cover. Also, it can be made from vulcanized rubber obtained from a rubber composition comprising butadiene rubber and zinc acrylate.

The solid core can be made from any material, as long as the above mentioned spring constant is maintained, but is generally formed by vulcanizing a rubber composition which comprises a polybutadiene rubber, zinc acrylate as co-crosslinking agent and an organic peroxide. The specific rubber composition generally produces the core having the above mentioned spring constant range and having excellent durability.

(Second three piece solid golf ball)

The second embodiment of the three piece golf ball of the present invention comprises a solid core, an intermediate layer formed on the solid core and a cover covering the intermediate layer, wherein the cover has a thickness of 1 to 3 mm and is formed from a resin composition having an elasticity modulus (E*) at −30° to +20° C. of 5,000 to 20,000 Kgf/cm² and a loss tangent at −30° to +20° C. of 0.15 or less, the intermediate layer has a thickness of 1 to 3 mm and is formed from an intermediate layer composition having an elasticity modulus (E*) at −30° to +20° C. of 1000 to 9,000 Kgf/cm² and a loss tangent at −30° to +20° C. of 0.02 to 0.1, the minimum value of the elasticity modulus of the intermediate layer being smaller than that of the cover, the solid core has a diameter of 30.7 to 38.7 mm and a spring constant at compression deformation of 15 to 50 Kgf/mm.

Figure 4:
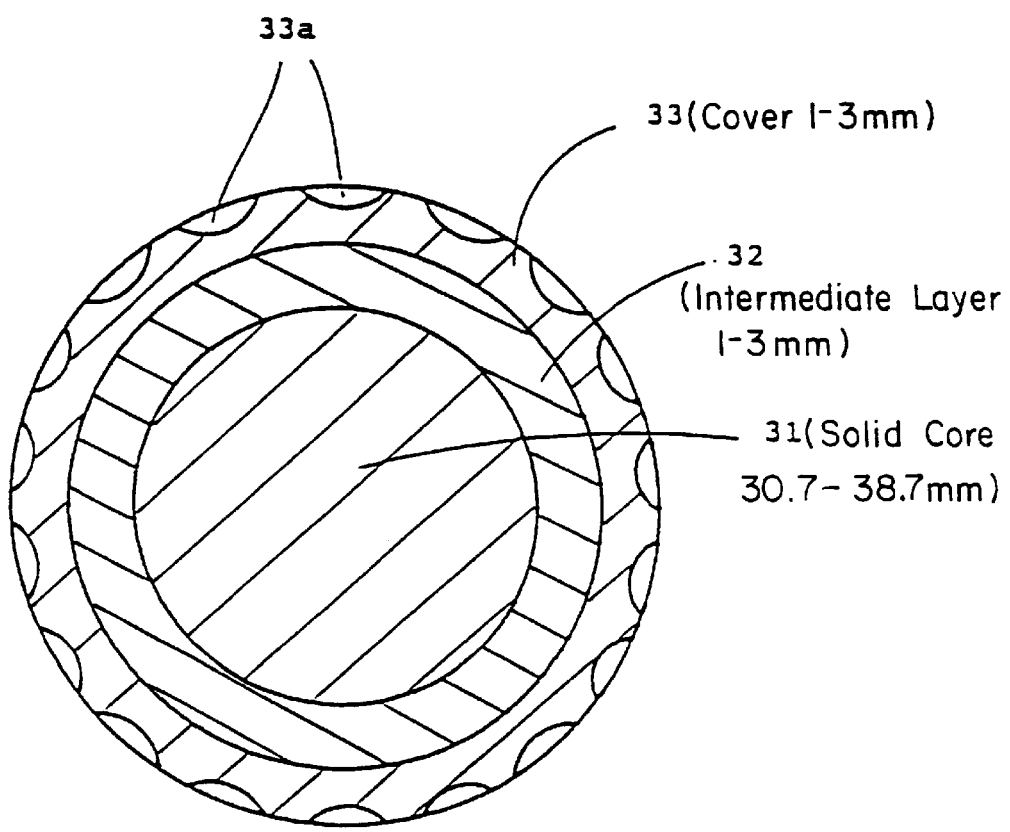

The second three piece solid golf ball is explained by using FIG. 4 which schematically shows a cross-section of one embodiment of the second three piece solid golf ball of the present invention. In FIG. 4, the number 31 shows a solid core, 32 is an intermediate layer and 33 is a cover on which some dimples 33a are present.

The solid core 31 has a diameter of 30.7 to 38.7 mm and a spring constant at compression deformation of 15 to 50 Kgf/mm.

The intermediate layer 32 is formed on the solid core 31 and has a thickness of 1 to 3 mm. It is formed from a resin composition having an elasticity modulus (E*) at −30° to +20° C. of 1000 to 9,000 Kgf/cm² and a loss tangent at −30° to +20° C. of 0.02 to 0.1, the minimum value of the elasticity modulus of the intermediate layer being less than that of the cover.

The cover 33 is formed on the intermediate layer 32 and has a thickness of 1 to 3 mm. It is formed from a cover composition having an elasticity modulus (E*) at −30° to +20° C. of 5,000 to 20,000 Kgf/cm² and a loss tangent at −30° to +20° C. of 0.15 or less. The surface of the cover 23 generally has suitable number of dimples 12a. If necessary, a paint layer or a marking is formed on the surface of the ball. The cover is formed from the above mentioned cover material.

The cover is basically formed from ionomer resin and the intermediate layer is formed from a mixture of ionomer resin and diene rubber. The solid core is the same as that of the first three piece solid golf ball.

EXAMPLES

The present invention is illustrated by the following Examples which, however, are not to be construed as limiting the present invention to their details.

(Thread wound golf ball)

Examples 1 to 8 and Comparative Examples 1 to 8

Thread wound cores which were used for Examples and Comparative Examples were obtained as follow.

A center was formed by preparing a rubber composition from the following ingredients shown in Table 1 and putting in a mold to vulcanize at 150° C. for 30 minutes. The center had a diameter of 30 mm.

TABLE 1

| Ingredients | Parts by weight |
| --- | --- |
| High butadiene rubber | 100 |
| Barium sulfate | 75 |
| Zinc oxide | 5 |
| Stearic acid | 2 |
| Sulfur | 10 |
| Vulcanization accelerator | 1.5 |

Thread rubber was formed from a mixture of natural rubber and low-cis polyisoprene (available from Shell Chemical Co., Ltd. as Cariflex IR-309) in weight ratio of 50:50. The thread rubber was wound on a center in a stretching condition to form a thread wound core having a diameter of 39.5 mm. When the thread rubber was wound, the stretching degree was changed to form thread wound cores having a spring constant of 13 Kgf/mm, 16 Kgf/mm, 26 Kgf/mm, 45 Kgf/mm, 60 Kgf/mm and 70 Kgf/mm respectively.

Cover compositions were prepared from the ingredients shown in Tables 2–5 in which the amount of the ingredient is indicated by parts by weight and the trade names are explained after Table 5.

For preparing a molten mixture of ionomer resin and diene rubber, a labplast mill available from Toyo Seiki K.K. was used and the mixture was conducted at 180° C. for 10 minutes.

The resulting cover composition was subjected to the determination of elasticity modulus and loss tangent at −30° to +20° C. The loss tangent and elasticity modulus were determined by preparing a strip sample having a thickness of 2 mm, a width of 4 mm and a length of 30 mm from the composition for cover or intermediate layer and measuring a temperature dispersion of dynamic loss tangent and dynamic elasticity modulus using a modified viscoelasticity spectrometer DVE-200 available from Shimadz Seisakusho Co., Ltd. at the conditions that deformation mode is stretching, dynamic strain is 0.25%, temperature range is −100° to +70° C., and frequency is 10 Hz. The results are shown in Tables 2 to 6, provided that the elasticity and loss tangent indicate both maximum value and minimum value.

TABLE 2

|  | Examples | | | |
| --- | --- | --- | --- | --- |
|  | 1 | 2 | 3 | 4 |
| Ingredients for cover composition | | | | |
| Hi-milan 1605*[1] | 60 | 60 | 60 | 60 |
| Esprene 501*[2] | 40 | 40 | 40 | 40 |
| Titanium dioxide | 2 | 2 | 2 | 2 |
| Barium sulfate | 3 | 3 | 3 | 3 |
| Elasticity (E*) | | | | |
| Maximum value (Kgf/cm$^2$) | 3500 | 3500 | 3500 | 3500 |
| Minimum value (Kgf/cm$^2$) | 1200 | 1200 | 1200 | 1200 |
| Loss tangent | | | | |
| Maximum value | 0.09 | 0.09 | 0.09 | 0.09 |
| Minimum value | 0.07 | 0.07 | 0.07 | 0.07 |

TABLE 3

|  | Examples | | | |
| --- | --- | --- | --- | --- |
|  | 5 | 6 | 7 | 8 |
| Ingredients for cover composition | | | | |
| Hi-milan AM7315*[3] | 80 | 80 | 80 | 80 |
| Esprene 501*[2] | 20 | 20 | 20 | 20 |
| Titanium dioxide | 2 | 2 | 2 | 2 |
| Barium sulfate | 3 | 3 | 3 | 3 |
| Elasticity (E*) | | | | |
| Maximum value (Kgf/cm$^2$) | 7500 | 7500 | 7500 | 7500 |
| Minimum value (Kgf/cm$^2$) | 3700 | 3700 | 3700 | 3700 |
| Loss tangent | | | | |
| Maximum value | 0.06 | 0.06 | 0.06 | 0.06 |
| Minimum value | 0.03 | 0.03 | 0.03 | 0.03 |

TABLE 4

|  | Comparative Examples | | | |
| --- | --- | --- | --- | --- |
|  | 1 | 2 | 3 | 4 |
| Ingredients for cover composition | | | | |
| Hi-milan 1855*[4] | 60 | 100 | 70 | 0 |
| Hi-milan AM 7317*[5] | 0 | 0 | 0 | 100 |
| Esprene 501*[2] | 40 | 0 | 30 | 0 |
| Titanium dioxide | 2 | 2 | 2 | 2 |
| Barium sulfate | 3 | 3 | 3 | 3 |
| Elasticity (E*) | | | | |
| Maximum value (Kgf/cm$^2$) | 2600 | 11000 | 3000 | 11200 |
| Minimum value (Kgf/cm$^2$) | 820 | 2400 | 1080 | 6000 |
| Loss tangent | | | | |
| Maximum value | 0.09 | 0.16 | 0.12 | 0.14 |
| Minimum value | 0.08 | 0.10 | 0.08 | 0.04 |

TABLE 5

|  | Comparative Examples | | | |
| --- | --- | --- | --- | --- |
|  | 1 | 2 | 3 | 4 |
| Ingredients for cover composition | | | | |
| Hi-milan 1605 | 60 | 80 | 0 | Balata cover*[6] |
| Hi-milan AM7315*[3] | 0 | 0 | 100 | |
| Esprene 501*[2] | 40 | 20 | 0 | |

TABLE 5-continued

|  | Comparative Examples | | | |
| --- | --- | --- | --- | --- |
|  | 1 | 2 | 3 | 4 |
| Titanium dioxide | 2 | 2 | 2 | |
| Barium sulfate | 3 | 3 | 3 | |
| Elasticity (E*) | | | | |
| Maximum value (Kgf/cm$^2$) | 3200 | 7500 | 11700 | 6000 |
| Minimum value (Kgf/cm$^2$) | 1050 | 3700 | 6500 | 3000 |
| Loss tangent | | | | |
| Maximum value | 0.09 | 0.06 | 0.14 | 0.10 |
| Minimum value | 0.07 | 0.03 | 0.03 | 0.03 |

*[1]Hi-milan 1605: Ethylene-methacrylic acid copolymer ionomer neutralized with sodium ion, available from Mitsui Du Pont Polychemical Co., Ltd.
*[2]Esprene 501: Ethylene propylene diene rubber available from Sumitomo Chemical Co., Ltd.
*[3]Hi-milan AM 7315: Ethylene-methacrylic acid copolymer ionomer neutralized with zinc ion, available from Mitsui Du Pont Polychemical Co., Ltd.
*[4]Hi-milan 1855: Ethylene-butyl acrylate-methacrylic acid terpolymer neutralized with zinc ion, available from Mitsui Du Pont Polychemical Co., Ltd.
*[5]Hi-milan AM 7317: Ethylene-methacrylic acid copolymer ionomer neutralized with zinc ion, available from Mitsui Du Pont Polychemical Co., Ltd.
*[6]Balata cover: Balata cover mainly containing transpolyisoprene.

The half shell having semi-spherical shape was prepared from the above cover composition and the thread wound core was wrapped with two of them. It was put in a mold and press-molded at 140° C. for 2 minutes. In case of the balata cover, the molded ball was vulcanized. The resulting one was coated with a paint to obtain a thread wound golf ball having a diameter of 42.8 mm.

The resulting golf ball were subjected to the measurement of ball weight, flight distance, spin amount, controllability, shot feel and flight performance and the results are shown in Tables 6 to 9. The controllability, shot feel and flight distance were determined by actual hit test. Table 6 to 9 also indicate elasticity, loss tangent of the cover composition and spring constant of the thread wound core. The spring constant was determined by compressing the core 1 mm and 3 mm at which weight amount was measured.

The flight distance was determined by equipping a No. 1 wood club with a swing robot available from True Temper Co., and hitting the golf ball at a head speed of 45 m/s, followed by measuring a point that the ball is landed on the ground. The spin amount was determined by equipping a No. 1 wood club and a No. 9 iron club and hitting a golf ball at 45 m/s for No.1 wood and at 35 m/s for No.9 iron, followed by continuously taking photographs of the marks present on the ball.

The flight distance and spin amount were indicated by an average value of eight golf balls. In Tables, No. 1 wood indicates as W#1 and No.9 iron indicates as I#9.

Actual hitting test was conducted by ten top-level amateurs having a handicap of 0 to 15. The controllability was determined by hitting a golf ball with an iron club and the shot feel and flight performance were determined by hitting it with a wood club. The criteria of the evaluation is as follow. When eight persons among ten persons show the same criteria, it was made as the final evaluation.

Ex.: Excellent
G: Good
A: Average
P: Poor
VP: Very poor

TABLE 6

| | Examples | | | |
|---|---|---|---|---|
| | 1 | 2 | 3 | 4 |
| Cover composition | | | | |
| Easticity: | | | | |
| Maximum (Kgf/cm$^2$) | 3500 | 3500 | 3500 | 3500 |
| Minimum (Kgf/cm$^2$) | 1200 | 1200 | 1200 | 1200 |
| Loss tangent: | | | | |
| Maximum | 0.09 | 0.09 | 0.09 | 0.09 |
| Minimum | 0.07 | 0.07 | 0.07 | 0.07 |
| Spring constant of the core (Kgf/mm) | 60 | 45 | 26 | 16 |
| Ball weight (g) | 45.4 | 45.4 | 45.3 | 45.3 |
| Flight distance (yards) | 221 | 218 | 214 | 212 |
| Spin amount (rpm) | | | | |
| W#1 | 3550 | 3650 | 3750 | 3850 |
| I#9 | 7750 | 7880 | 8000 | 8130 |
| Controllability | Ex. | Ex. | Ex. | G |
| Shot feel | G | Ex. | Ex. | G |
| Flight performance | Ex. | Ex. | G | G |

TABLE 7

| | Examples | | | |
|---|---|---|---|---|
| | 5 | 6 | 7 | 8 |
| Cover composition | | | | |
| Easticity: | | | | |
| Maximum (Kgf/cm$^2$) | 7500 | 7500 | 7500 | 7500 |
| Minimum (Kgf/cm$^2$) | 3700 | 3700 | 3700 | 3700 |
| Loss tangent: | | | | |
| Maximum | 0.06 | 0.06 | 0.06 | 0.06 |
| Minimum | 0.03 | 0.03 | 0.03 | 0.03 |
| Spring constant of the core (Kgf/mm) | 60 | 45 | 26 | 16 |
| Ball weight (g) | 45.4 | 45.4 | 45.3 | 45.3 |
| Flight distance (yards) | 225 | 223 | 218 | 216 |
| Spin amount (rpm) | | | | |
| W#1 | 3400 | 3450 | 3580 | 3700 |
| I#9 | 7500 | 7650 | 7800 | 7900 |
| Controllability | G | Ex. | Ex. | Ex. |
| Shot feel | G | Ex. | Ex. | G |
| Flight performance | Ex. | Ex. | G | G |

TABLE 8

| | Comparative Examples | | | |
|---|---|---|---|---|
| | 1 | 2 | 3 | 4 |
| Cover composition | | | | |
| Easticity: | | | | |
| Maximum (Kgf/cm$^2$) | 2600 | 11000 | 3000 | 10200 |
| Minimum (Kgf/cm$^2$) | 820 | 2400 | 1080 | 5000 |
| Loss tangent: | | | | |
| Maximum | 0.09 | 0.16 | 0.12 | 0.14 |
| Minimum | 0.08 | 0.10 | 0.08 | 0.04 |
| Spring constant of the core (Kgf/mm) | 60 | 16 | 60 | 16 |
| Ball weight (g) | 45.4 | 45.3 | 45.4 | 45.3 |
| Flight distance (yards) | 206 | 199 | 201 | 200 |
| Spin amount (rpm) | | | | |
| W#1 | 4200 | 4000 | 3900 | 2420 |
| I#9 | 8300 | 8000 | 8260 | 6700 |
| Controllability | A | A | A | P |
| Shot feel | A | VP | P | P |
| Flight performance | A | P | P | P |

TABLE 9

| | Comparative Examples | | | |
|---|---|---|---|---|
| | 5 | 6 | 7 | 8 |
| Cover composition | | | | |
| Easticity: | | | | |
| Maximum (Kgf/cm$^2$) | 3200 | 7500 | 11700 | 6000 |
| Minimum (Kgf/cm$^2$) | 1050 | 3700 | 6500 | 3000 |
| Loss tangent: | | | | |
| Maximum | 0.09 | 0.06 | 0.14 | 0.10 |
| Minimum | 0.07 | 0.03 | 0.03 | 0.03 |
| Spring constant of the core (Kgf/mm) | 70 | 13 | 45 | 45 |
| Ball weight (g) | 45.4 | 45.2 | 45.4 | 45.3 |
| Flight distance (yards) | 208 | 195 | 220 | 208 |
| Spin amount (rpm) | | | | |
| W#1 | 2560 | 2400 | 2400 | 3600 |
| I#9 | 6850 | 6520 | 6400 | 7600 |
| Controllability | P | VP | VP | G |
| Shot feel | P | VP | VP | G |
| Flight performance | A | VP | Ex. | A |

As shown in Tables 6 and 7, the golf ball of Examples 1–8 is excellent in controllability and shot feel and show longer flight distance. In Comparative Example 1, the minimum value of the elasticity is outside the claimed range. In Comparative Example 2, the maximum value of the elasticity and loss tangent are outside the claimed range. In Comparative Example 3, the maximum value of the loss tangent is larger than the claimed range. In Comparative Example 4, the maximum value of the elasticity and the maximum value of the loss tangent are both larger than the claimed range. In Comparative Example 5, the spring constant of the core is larger than the claimed range. In Comparative Example 6, the spring constant of the core is smaller than the claimed range. Therefore, the golf balls of Comparative Examples 1–6 show shorter flight distance and poor in controllability and shot feel.

In Comparative Example 7, the cover is only made from ionomer resin and therefore the resultant golf ball shows longer flight distance, but poor in controllability and shot feel. Comparative Example 8 shows an example of a balata cover thread wound golf ball and therefore shows very good in controllability and shot feel, but flight distance is very short.

(Two piece solid golf ball)

Examples 9 to 16 and Comparative Examples 9 to 16

Two piece solid golf balls which were used for Examples and Comparative Examples were obtained through the steps (1) to (3).

(1) Preparation of solid core

A solid core was prepared from a rubber composition containing high-cis polybutadiene rubber, zinc acrylate as co-crosslinking agent, zinc oxide as filler for weight adjuster and dicumyl peroxide. Vulcanization was conducted at 160° C. for 30 minutes in a mold. The resulting solid cores respectively had a spring constant of 17 Kgf/mm, 30 Kgf/mm, 40 Kgf/mm, 50 Kgf/mm and 63 Kgf/mm by changing the formulating amount of zinc acrylate.

(2) Preparation of the cover composition.

Cover compositions were prepared from the ingredients shown in Tables 10–13 in which the amount of the ingredient is indicated by parts by weight and the trade names are explained after Table 13. The cover composition was obtained by mixing in a twin-screw extruder with heating.

The resulting cover composition was subjected to the determination of elasticity modulus and loss tangent at −30° to +20° C., which was conducted as explained in Example 1–8. The results are shown in Tables 10 to 13, provided that the elasticity and loss tangent indicate both maximum value and minimum value.

TABLE 10

| | Examples | | | |
|---|---|---|---|---|
| | 9 | 10 | 11 | 12 |
| Ingredients for cover composition | | | | |
| Surlyn AD 8511*[11] | 46 | 46 | 46 | 46 |
| Surlyn AD 8512*[12] | 19 | 19 | 19 | 19 |
| Esprene 505A*[13] | 35 | 35 | 35 | 35 |
| Tackiroll*[14] | 1 | 1 | 1 | 1 |
| Titanium dioxide | 2 | 2 | 2 | 2 |
| Elasticity (E*) | | | | |
| Maximum value (Kgf/cm$^2$) | 5500 | 5500 | 5500 | 5500 |
| Minimum value (Kgf/cm$^2$) | 2800 | 2800 | 2800 | 2800 |
| Loss tangent | | | | |
| Maximum value | 0.059 | 0.059 | 0.059 | 0.059 |
| Minimum value | 0.056 | 0.056 | 0.056 | 0.056 |

TABLE 11

| | Examples | | | |
|---|---|---|---|---|
| | 13 | 14 | 15 | 16 |
| Ingredients for cover composition | | | | |
| Surlyn AD 8511*[11] | 46 | 49 | 49 | 52.5 |
| Surlyn AD 8512*[12] | 19 | 21 | 21 | 22.5 |
| Esprene 505A*[13] | 35 | 30 | 30 | 25 |
| Tackiroll*[14] | 1 | 1 | 1 | 1 |
| Titanium dioxide | 2 | 2 | 2 | 2 |
| Elasticity (E*) | | | | |
| Maximum value (Kgf/cm$^2$) | 5500 | 6000 | 6000 | 6500 |
| Minimum value (Kgf/cm$^2$) | 2800 | 2900 | 2900 | 3100 |
| Loss tangent | | | | |
| Maximum value | 0.059 | 0.061 | 0.061 | 0.058 |
| Minimum value | 0.056 | 0.057 | 0.057 | 0.049 |

TABLE 12

| | Comparative Examples | | | |
|---|---|---|---|---|
| | 9 | 10 | 11 | 12 |
| Ingredients for cover composition | | | | |
| Surlyn AD 8511*[11] | 46 | 46 | 46 | 46 |
| Surlyn AD 8512*[12] | 19 | 19 | 19 | 19 |
| Esprene 505A*[13] | 35 | 35 | 35 | 35 |
| Tackiroll*[14] | 1 | 1 | 1 | 1 |
| Titanium dioxide | 2 | 2 | 2 | 2 |
| Elasticity (E*) | | | | |
| Maximum value (Kgf/cm$^2$) | 5500 | 5500 | 5500 | 5500 |
| Minimum value (Kgf/cm$^2$) | 2800 | 2800 | 2800 | 2800 |
| Loss tangent | | | | |
| Maximum value | 0.059 | 0.059 | 0.059 | 0.059 |
| Minimum value | 0.056 | 0.056 | 0.056 | 0.056 |

TABLE 13

| | Comparative Examples | | | |
|---|---|---|---|---|
| | 13 | 14 | 15 | 16 |
| Ingredients for cover composition | | | | |
| Hi-milan 1605*[15] | 50 | 0 | 0 | 20 |
| Hi-milan 1706*[13] | 50 | 50 | 0 | 0 |
| Hi-milan 1707*[17] | 0 | 50 | 0 | 0 |
| Hi-milan 1855*[18] | 0 | 0 | 100 | 80 |
| Titanium dioxide | 2 | 2 | 2 | 2 |
| Elasticity (E*) | | | | |
| Maximum value (Kgf/cm$^2$) | 12500 | 13000 | 11400 | 11700 |
| Minimum value (Kgf/cm$^2$) | 6500 | 6700 | 2400 | 3100 |
| Loss tangent | | | | |
| Maximum value | 0.09 | 0.07 | 0.156 | 0.14 |
| Minimum value | 0.06 | 0.05 | 0.102 | 0.09 |

*[11]Surlyn AD 8511: Ethylene-methacrylic acid copolymer ionomer neutralized with zinc ion, available from Du Pont Co.
*[12]Surlyn AD 8512: Ethylene-methacrylic acid copolymer ionomer neutralized with sodium ion, available from Du Pont Co.
*[13]Esprene 505A: Ethylene propylene diene rubber available from Sumitomo Chemical Co., Ltd.
*[14]Tackiroll: Phenol resin (resin crosslinking agent) available from Sumitomo Chemical Co., Ltd.
*[15]Hi-milan 1605: Ethylene-methacrylic acid copolymer ionomer neutralized with sodium ion, available from Mitsui Du Pont Polychemical Co., Ltd.
*[16]Hi-milan 1706: Ethylene-methacrylic acid copolymer ionomer neutralized with zinc ion, available from Mitsui Du Pont Polychemical Co., Ltd.
*[17]Hi-milan 1707: Ethylene-methacrylic acid copolymer ionomer neutralized with sodium ion, available from Mitsui Du Pont Polychemical Co., Ltd.
*[18]Hi-milan 1855: Ethylene-butyl acrylate-methacrylic acid terpolymer neutralized with zinc ion, available from Mitsui Du Pont Polychemical Co., Ltd.

(3) Preparation of golf ball

The cover composition obtained above (2) was injection-molded on the solid core obtained in above (1) and subjected to seem buff and paint pretreatment. It was then coated two times with paint and marking was conducted thereon to form a two piece solid golf ball having a diameter of 42.7 mm.

The resulting golf ball were subjected to the measurement of ball weight, flight distance, spin amount, controllability, shot feel and flight performance as explained in Example 1–8 and the results are shown in Tables 14 to 17. Table 14 to 17 also indicate elasticity, loss tangent of the cover composition and spring constant of the solid core.

TABLE 14

|  | Examples | | | |
| --- | --- | --- | --- | --- |
|  | 9 | 10 | 11 | 12 |
| Cover | | | | |
| Thickness (mm) | 2.1 | 2.1 | 2.1 | 2.1 |
| Elasticity: | | | | |
| Maximum (Kgf/cm²) | 5500 | 5500 | 5500 | 5500 |
| Minimum (Kgf/cm²) | 2800 | 2800 | 2800 | 2800 |
| Loss tangent: | | | | |
| Maximum | 0.059 | 0.059 | 0.059 | 0.059 |
| Minimum | 0.056 | 0.056 | 0.056 | 0.056 |
| Solid core | | | | |
| Diameter (mm) | 38.5 | 38.5 | 38.5 | 39.7 |
| Spring constant (Kgf/mm) | 30 | 40 | 50 | 40 |
| Ball weight (g) | 45.4 | 45.4 | 45.4 | 45.4 |
| Flight distance (yards) | 218 | 220 | 223 | 219 |
| Spin amount (rpm) | | | | |
| W#1 | 3200 | 3300 | 3350 | 3350 |
| I#9 | 7800 | 7900 | 8100 | 8050 |
| Controllability | G | Ex. | Ex. | Ex. |
| Shot feel | Ex. | Ex. | Ex. | Ex. |
| Flight performance | G | G | Ex. | G |

TABLE 15

|  | Examples | | | |
| --- | --- | --- | --- | --- |
|  | 13 | 14 | 15 | 16 |
| Cover | | | | |
| Thickness (mm) | 2.6 | 2.1 | 2.1 | 2.1 |
| Elasticity: | | | | |
| Maximum (Kgf/cm²) | 5500 | 6000 | 6000 | 6500 |
| Minimum (Kgf/cm²) | 2800 | 2900 | 2900 | 3100 |
| Loss tangent: | | | | |
| Maximum | 0.059 | 0.061 | 0.061 | 0.058 |
| Minimum | 0.056 | 0.057 | 0.057 | 0.049 |
| Solid core | | | | |
| Diameter (mm) | 37.5 | 38.5 | 38.5 | 39.7 |
| Spring constant (Kgf/mm) | 40 | 40 | 50 | 40 |
| Ball weight (g) | 45.4 | 45.4 | 45.4 | 45.4 |
| Flight distance (yards) | 222 | 221 | 224 | 222 |
| Spin amount (rpm) | | | | |
| W#1 | 3250 | 3250 | 3300 | 3200 |
| I#9 | 7800 | 7800 | 7900 | 7750 |
| Controllability | G | G | Ex. | G |
| Shot feel | G | Ex. | G | G |
| Flight performance | Ex. | Gt | Ex. | G |

TABLE 16

|  | Comparative Examples | | | |
| --- | --- | --- | --- | --- |
|  | 9 | 10 | 11 | 12 |
| Cover | | | | |
| Thickness (mm) | 2.1 | 2.1 | 0.9 | 3.2 |
| Elasticity: | | | | |
| Maximum (Kgf/cm²) | 5500 | 5500 | 5500 | 5500 |
| Minimum (Kgf/cm²) | 2800 | 2800 | 2800 | 2800 |
| Loss tangent: | | | | |
| Maximum | 0.059 | 0.059 | 0.059 | 0.059 |
| Minimum | 0.056 | 0.056 | 0.056 | 0.056 |
| Solid core | | | | |
| Diameter (mm) | 38.5 | 38.5 | 40.9 | 36.5 |
| Spring constant (Kgf/mm) | 17 | 63 | 40 | 40 |
| Ball weight (g) | 45.4 | 45.4 | 45.4 | 45.4 |
| Flight distance (yards) | 215 | 214 | 214 | 213 |
| Spin amount (rpm) | | | | |
| W#1 | 2900 | 3600 | 3500 | 3100 |
| I#9 | 6300 | 7800 | 7700 | 6900 |
| Controllability | P | G | G | G |
| Shot feel | G | P | G | P |
| Flight performance | P | P | P | VP |

TABLE 17

|  | Comparative Examples | | | |
| --- | --- | --- | --- | --- |
|  | 13 | 14 | 15 | 16 |
| Cover | | | | |
| Thickness (mm) | 2.1 | 2.1 | 2.1 | 2.1 |
| Elasticity: | | | | |
| Maximum (Kgf/cm²) | 12500 | 13000 | 11400 | 11700 |
| Minimum (Kgf/cm²) | 6500 | 6700 | 2400 | 3100 |
| Loss tangent: | | | | |
| Maximum | 0.09 | 0.07 | 0.16 | 0.14 |
| Minimum | 0.06 | 0.05 | 0.10 | 0.09 |
| Solid core | | | | |
| Diameter (mm) | 38.5 | 38.5 | 38.5 | 38.5 |
| Spring constant (Kgf/mm) | 40 | 40 | 40 | 40 |
| Ball weight (g) | 45.4 | 45.4 | 45.4 | 45.4 |
| Flight distance (yards) | 221 | 222 | 210 | 213 |
| Spin amount (rpm) | | | | |
| W#1 | 2900 | 2800 | 3600 | 3400 |
| I#9 | 6300 | 6200 | 8100 | 7600 |
| Controllability | VP | VP | G | G |
| Shot feel | VP | VP | A | A |
| Flight performance | G | Ex. | VP | VP |

As shown in Tables 14 and 15, the golf ball of Examples 9–16 show excellent in controllability and shot feel and longer flight distance. In Comparative Example 9, the spring constant of the solid core is smaller than the claimed range. In Comparative Example 10, the spring constant of the solid core is lager than the claimed range. In Comparative Example 11, the cover thickness is thinner than the claimed range and the diameter of the solid core is larger than the claimed range. In Comparative Example 12, the cover thickness is larger than the claimed range and the diameter of the solid core is smaller than the claimed range. Therefore, the golf balls of Comparative Examples 9–12 show shorter flight distance and poor in controllability or shot feel.

In Comparative Examples 13 and 14, the cover is only made from hard ionomer resin and therefore the resultant golf ball shows longer flight distance, but poor in controllability and shot feel, as shown in Table 17. Since Comparative Example 15 uses only soft ionomer resin as cover material and Comparative Example 16 uses large amount of the soft ionomer resin in the cover material, the maximum value of the loss tangent of the cover is larger than the claimed range and rebound characteristics reduce. Accordingly, the flight distance is shorter and the shot feel is also poor, as shown in Table 17.

(First three piece solid golf ball)

Examples 17–24 and Comparative Example 17–24

Three piece solid golf balls which were used for Examples and Comparative Examples were obtained through the steps (1) to (4).

(1) Preparation of solid core

A solid core was prepared from a rubber composition containing high-cis polybutadiene rubber, zinc acrylate as co-crosslinking agent, zinc oxide as filler for weight adjuster and dicumyl peroxide. Vulcanization was conducted at 160° C. for 30 minutes in a mold. The resulting solid cores respectively had a spring constant of 17 Kgf/mm, 30 Kgf/mm, 35 Kgf/mm, 40 Kgf/mm, 50 Kgf/mm and 58 Kgf/mm by changing the formulating amount of zinc acrylate.

(2) Preparation of the resin composition for intermediate layer.

Resin composition for intermediate layer were prepared from the ingredients shown in Tables 18–21 in which the amount of the ingredient is indicated by parts by weight and the trade names are explained after Table 21. The composition was prepared by mixing the ingredients with heating using a twin-screw extruder.

The resulting composition was subjected to the determination of elasticity modulus and loss tangent at −30° to +20° C., which was conducted as explained in Example 1–8. The results are shown in Tables 18 to 21, provided that the elasticity and loss tangent indicate both maximum value and minimum value.

TABLE 18

|  | Examples | | | |
|---|---|---|---|---|
|  | 17 | 18 | 19 | 20 |
| Ingredients for intermediate layer | | | | |
| Hi-milan 1605*[21] | 50 | 50 | 50 | 50 |
| Hi-milan 1706*[22] | 50 | 50 | 50 | 50 |
| Titanium dioxide | 2 | 2 | 2 | 2 |
| Elasticity (E*) | | | | |
| Maximum value (Kgf/cm$^2$) | 12500 | 12500 | 12500 | 12500 |
| Minimum value (Kgf/cm$^2$) | 6500 | 6500 | 6500 | 6500 |
| Loss tangent | | | | |
| Maximum value | 0.09 | 0.09 | 0.09 | 0.09 |
| Minimum value | 0.06 | 0.06 | 0.06 | 0.06 |

TABLE 19

|  | Examples | | | |
|---|---|---|---|---|
|  | 21 | 22 | 23 | 24 |
| Ingredients for intermediate layer | | | | |
| Hi-milan 1605*[21] | 50 | 50 | 0 | 0 |
| Hi-milan 1706*[22] | 50 | 50 | 50 | 50 |

TABLE 19-continued

|  | Examples | | | |
|---|---|---|---|---|
|  | 21 | 22 | 23 | 24 |
| Hi-milan 1707*[23] | 0 | 0 | 50 | 50 |
| Titanium dioxide | 2 | 2 | 2 | 2 |
| Elasticity (E*) | | | | |
| Maximum value (Kgf/cm$^2$) | 12500 | 12500 | 13000 | 13000 |
| Minimum value (Kgf/cm$^2$) | 6500 | 6500 | 6700 | 6700 |
| Loss tangent | | | | |
| Maximum value | 0.09 | 0.09 | 0.07 | 0.07 |
| Minimum value | 0.06 | 0.06 | 0.05 | 0.05 |

TABLE 20

|  | Comparative Examples | | | |
|---|---|---|---|---|
|  | 17 | 18 | 19 | 20 |
| Ingredients for intermediate layer | | | | |
| Hi-milan 1605*[21] | 50 | 50 | 50 | 50 |
| Hi-milan 1706*[22] | 50 | 50 | 50 | 50 |
| Titanium dioxide | 2 | 2 | 2 | 2 |
| Elasticity (E*) | | | | |
| Maximum value (Kgf/cm$^2$) | 12500 | 12500 | 12500 | 12500 |
| Minimum value (Kgf/cm$^2$) | 6500 | 6500 | 6500 | 6500 |
| Loss tangent | | | | |
| Maximum value | 0.09 | 0.09 | 0.09 | 0.09 |
| Minimum value | 0.06 | 0.06 | 0.06 | 0.06 |

TABLE 21

|  | Comparative Examples | | | |
|---|---|---|---|---|
|  | 21 | 22 | 23 | 24 |
| Ingredients for intermediate layer | | | | |
| Hi-milan 1706*[22] | 50 | 50 | 50 | 50 |
| Hi-milan 1707*[23] | 50 | 50 | 50 | 50 |
| Titanium dioxide | 2 | 2 | 2 | 2 |
| Elasticity (E*) | | | | |
| Maximum value (Kgf/cm$^2$) | 13000 | 13000 | 13000 | 13000 |
| Minimum value (Kgf/cm$^2$) | 6700 | 6700 | 6700 | 6700 |
| Loss tangent | | | | |
| Maximum value | 0.07 | 0.07 | 0.07 | 0.07 |
| Minimum value | 0.05 | 0.05 | 0.05 | 0.05 |

*[21]Hi-milan 1605: Ethylene-methacrylic acid copolymer ionomer neutralized with sodium ion, available from Mitsui Du Pont Polychemical Co., Ltd.
*[22]Hi-milan 1706: Ethylene-methacrylic acid copolymer ionomer neutralized with zinc ion, available from Mitsui Du Pont Polychemical Co., Ltd.
*[23]Hi-milan 1707: Ethylene-methacrylic acid copolymer ionomer neutralized with sodium ion, available from Mitsui Du Pont Polychemical Co., Ltd.

(3) Preparation of the cover composition.

Cover compositions were prepared from the ingredients shown in Tables 22–25 in which the amount of the ingredient is indicated by parts by weight and the trade names are explained after Table 25. The cover composition was prepared by mixing in a twin-screw extruder with heating.

The resulting cover composition was subjected to the determination of elasticity modulus and loss tangent at −30° to +20° C., which was conducted as explained in Example 1–8. The results are shown in Tables 22 to 25, provided that the elasticity and loss tangent indicate both maximum value and minimum value.

TABLE 22

|  | Examples | | | |
|---|---|---|---|---|
|  | 17 | 18 | 19 | 20 |
| Ingredients for cover composition | | | | |
| Surlyn AD 8511*[24] | 46 | 46 | 46 | 46 |
| Surlyn AD 8512*[25] | 19 | 19 | 19 | 19 |
| Esprene 505A*[26] | 35 | 35 | 35 | 35 |
| Tackiroll*[27] | 1 | 1 | 1 | 1 |
| Titanium dioxide | 2 | 2 | 2 | 2 |
| Elasticity (E*) | | | | |
| Maximum value (Kgf/cm$^2$) | 5500 | 5500 | 5500 | 5500 |
| Minimum value (Kgf/cm$^2$) | 2800 | 2800 | 2800 | 2800 |
| Loss tangent | | | | |
| Maximum value | 0.059 | 0.059 | 0.059 | 0.059 |
| Minimum value | 0.056 | 0.056 | 0.056 | 0.056 |

TABLE 23

|  | Examples | | | |
|---|---|---|---|---|
|  | 21 | 22 | 23 | 24 |
| Ingredients for cover composition | | | | |
| Surlyn AD 8511*[24] | 49 | 52.5 | 46 | 46 |
| Surlyn AD 8512*[25] | 21 | 22.5 | 19 | 19 |
| Esprene 505A*[26] | 30 | 25 | 35 | 35 |
| Tackiroll*[27] | 1 | 1 | 1 | 1 |
| Titanium dioxide | 2 | 2 | 2 | 2 |
| Elasticity (E*) | | | | |
| Maximum value (Kgf/cm$^2$) | 6000 | 6500 | 5500 | 5500 |
| Minimum value (Kgf/cm$^2$) | 2900 | 3100 | 2800 | 2800 |
| Loss tangent | | | | |
| Maximum value | 0.061 | 0.058 | 0.059 | 0.059 |
| Minimum value | 0.057 | 0.049 | 0.056 | 0.056 |

TABLE 24

|  | Comparative Examples | | | |
|---|---|---|---|---|
|  | 17 | 18 | 19 | 20 |
| Ingredients for cover composition | | | | |
| Surlyn AD 8511*[24] | 49 | 49 | 49 | 49 |
| Surlyn AD 8512*[25] | 19 | 19 | 19 | 19 |
| Esprene 505A*[26] | 35 | 35 | 35 | 35 |
| Tackiroll*[27] | 1 | 1 | 1 | 1 |
| Titanium dioxide | 2 | 2 | 2 | 2 |

TABLE 24-continued

|  | Comparative Examples | | | |
|---|---|---|---|---|
|  | 17 | 18 | 19 | 20 |
| Elasticity (E*) | | | | |
| Maximum value (Kgf/cm$^2$) | 5500 | 5500 | 5500 | 5500 |
| Minimum value (Kgf/cm$^2$) | 2800 | 2800 | 2800 | 2800 |
| Loss tangent | | | | |
| Maximum value | 0.059 | 0.059 | 0.059 | 0.05 |
| Minimum value | 0.056 | 0.056 | 0.056 | 0.05 |

TABLE 25

|  | Comparative Examples | | | |
|---|---|---|---|---|
|  | 21 | 22 | 23 | 24 |
| Ingredients for cover composition | | | | |
| Hi-milan 1665 | 50 | 0 | 0 | 20 |
| Hi-milan 1706 | 50 | 0 | 0 | 0 |
| Surlyn AD 8511*[24] | 0 | 70 | 0 | 0 |
| Surlyn AD 8512*[25] | 0 | 30 | 0 | 0 |
| Hi-milan 1855*[28] | 0 | 0 | 100 | 80 |
| Titanium dioxide | 2 | 2 | 2 | 2 |
| Elasticity (E*) | | | | |
| Maximum value (Kgf/cm$^2$) | 12500 | 9600 | 11400 | 11700 |
| Minimum value (Kgf/cm$^2$) | 6500 | 4000 | 2400 | 3100 |
| Loss tangent | | | | |
| Maximum value | 0.09 | 0.07 | 0.156 | 0.14 |
| Minimum value | 0.06 | 0.05 | 0.102 | 0.09 |

*[24]Surlyn AD 8511: Ethylene-methacrylic acid copolymer ionomer neutralized with zinc ion, available from Du Pont Co.
*[25]Surlyn AD 8512: Ethylene-methacrylic acid copolymer ionomer neutralized with sodium ion, available from Du Pont Co.
*[26]Esprene 505A: Ethylene propylene diene rubber available from Sumitomo Chemical Co., Ltd.
*[27]Tackiroll: Phenol resin (resin crosslinking agent) available from Sumitomo Chemical Co., Ltd.
*[28]Hi-milan 1855: Ethylene-butyl acrylate-methacrylic acid terpolymer neutralized with zinc ion, available from Mitsui Du Pont Polychemical Co., Ltd.

(4) Preparation of golf ball

The resin composition for intermediate layer obtained above (2) was injection-molded on the solid core obtained in above (1) and then the cover composition obtained in the above (3) was injection-molded thereon. It was then subjected to seem buff and paint pretreatment. It was then coated two times with paint and marking was conducted thereon to form a three piece solid golf ball having a diameter of 42.7 mm.

The resulting golf ball were subjected to the measurement of ball weight, flight distance, spin amount, controllability, shot feel and flight performance as explained in Example 1–8 and the results are shown in Tables 26 to 29. Table 26 to 29 also indicate elasticity, loss tangent of the cover composition and intermediate layer, and spring constant of the thread wound core.

TABLE 26

|  | Examples | | | |
| --- | --- | --- | --- | --- |
|  | 17 | 18 | 19 | 20 |
| Cover |  |  |  |  |
| Thickness (mm) | 2.0 | 2.0 | 2.0 | 1.5 |
| Elasticity: |  |  |  |  |
| Maximum (Kgf/cm$^2$) | 5500 | 5500 | 5500 | 5500 |
| Minimum (Kgf/cm$^2$) | 2800 | 2800 | 2800 | 2800 |
| Loss tangent: |  |  |  |  |
| Maximum | 0.059 | 0.059 | 0.059 | 0.059 |
| Minimum | 0.056 | 0.056 | 0.056 | 0.056 |
| Intermediate layer |  |  |  |  |
| Thickness (mm) | 2.0 | 2.0 | 2.0 | 2.0 |
| Elasticity: |  |  |  |  |
| Maximum (Kgf/cm$^2$) | 12500 | 12500 | 12500 | 12500 |
| Minimum (Kgf/cm$^2$) | 6500 | 6500 | 6500 | 6500 |
| Loss tangent: |  |  |  |  |
| Maximum | 0.09 | 0.09 | 0.09 | 0.09 |
| Minimum | 0.06 | 0.06 | 0.06 | 0.06 |
| Solid core |  |  |  |  |
| Diameter (mm) | 36.7 | 36.7 | 36.7 | 36.7 |
| Spring constant (Kgf/mm) | 30 | 40 | 50 | 40 |
| Ball weight (g) | 45.5 | 45.5 | 45.5 | 45.5 |
| Flight distance (yards) | 222 | 224 | 224 | 223 |
| Spin amount (rpm) |  |  |  |  |
| W#1 | 3100 | 3250 | 3300 | 3300 |
| I#9 | 7800 | 8100 | 8200 | 8200 |
| Controllability | G | Ex | Ex | Ex. |
| Shot feel | Ex. | Ex. | Ex. | Ex. |
| Flight performance | G | G | G | G |

TABLE 27

|  | Examples | | | |
| --- | --- | --- | --- | --- |
|  | 21 | 22 | 23 | 24 |
| Cover |  |  |  |  |
| Thickness (mm) | 2.0 | 2.0 | 2.0 | 2.0 |
| Elasticity: |  |  |  |  |
| Maximum (Kgf/cm$^2$) | 6000 | 6500 | 5500 | 5500 |
| Minimum (Kgt/cm$^2$) | 2900 | 3100 | 2800 | 2800 |
| Loss tangent: |  |  |  |  |
| Maximum | 0.061 | 0.058 | 0.059 | 0.059 |
| Minimum | 0.057 | 0.049 | 0.056 | 0.056 |
| Intermediate layer |  |  |  |  |
| Thickness (mm) | 2.0 | 2.0 | 2.0 | 2.0 |
| Elasticity: |  |  |  |  |
| Maximum (Kgf/cm$^2$) | 12500 | 12500 | 13000 | 13000 |
| Minimum (Kgf/cm$^2$) | 6500 | 6500 | 6700 | 6700 |
| Loss tangent: |  |  |  |  |
| Maximum | 0.09 | 0.09 | 0.07 | 0.07 |
| Minimum | 0.06 | 0.06 | 0.05 | 0.05 |
| Solid core |  |  |  |  |
| Diameter (mm) | 36.7 | 36.7 | 36.7 | 36.7 |
| Spring constant (Kgf/mm) | 40 | 40 | 35 | 40 |
| Ball weight (g) | 45.5 | 45.5 | 45.5 | 45.5 |
| Flight distance (yards) | 225 | 226 | 224 | 225 |
| Spin amount (rpm) |  |  |  |  |
| W#1 | 3150 | 3050 | 3200 | 3250 |
| I#9 | 7900 | 7700 | 8000 | 8100 |
| Controllabitity | G | G | G | Ex. |
| Shot feel | Ex. | Ex. | Ex. | Ex. |
| Flight performance | Ex. | Ex. | G | Ex. |

TABLE 28

|  | Comparative Examples | | | |
| --- | --- | --- | --- | --- |
|  | 17 | 18 | 19 | 20 |
| Cover |  |  |  |  |
| Thickness (mm) | 2.0 | 2.0 | 0.9 | 3.3 |
| Elasticity: |  |  |  |  |
| Maximum (Kgf/cm$^2$) | 5500 | 5500 | 5500 | 5500 |
| Minimum (Kgf/cm$^2$) | 2800 | 2800 | 2800 | 2800 |
| Loss tangent: |  |  |  |  |
| Maximum | 0.059 | 0.059 | 0.059 | 0.059 |
| Minimum | 0.056 | 0.056 | 0.056 | 0.056 |
| Intermediate layer |  |  |  |  |
| Thickness (mm) | 2.0 | 2.0 | 2.0 | 2.0 |
| Elasticity: |  |  |  |  |
| Maximum (Kgf/cm$^2$) | 12500 | 12500 | 12500 | 12500 |
| Minimum (Kgf/cm$^2$) | 6500 | 6500 | 6500 | 6500 |
| Loss tangent: |  |  |  |  |
| Maximum | 0.09 | 0.09 | 0.09 | 0.09 |
| Minimum | 0.06 | 0.06 | 0.06 | 0.06 |
| Solid core |  |  |  |  |
| Diameter (mm) | 36.7 | 36.7 | 39.1 | 29.5 |
| Spring constant (Kgf/mm) | 17 | 58 | 40 | 40 |
| Ball weight (g) | 45.5 | 45.5 | 45.5 | 45.5 |
| Flight distance (yards) | 215 | 215 | 217 | 215 |
| Spin amount (rpm) |  |  |  |  |
| W#1 | 2900 | 3500 | 3500 | 3100 |
| I#9 | 6500 | 7900 | 7800 | 7200 |
| Controllability | P | G | G | G |
| Shot feel | G | P | G | P |
| Flight performance | P | A | A | A |

TABLE 29

|  | Comparative Examples | | | |
| --- | --- | --- | --- | --- |
|  | 21 | 22 | 23 | 24 |
| Cover |  |  |  |  |
| Thickness (mm) | 2.0 | 2.0 | 2.0 | 2.0 |
| Elasticity: |  |  |  |  |
| Maximum (Kgf/cm$^2$) | 12500 | 9600 | 11400 | 11700 |
| Minimum (Kgf/cm$^2$) | 6500 | 4000 | 2400 | 3100 |
| Loss tangent: |  |  |  |  |
| Maximum | 0.09 | 0.07 | 0.156 | 0.14 |
| Minimum | 0.06 | 0.05 | 0.102 | 0.09 |

TABLE 29-continued

| | Comparative Examples | | | |
|---|---|---|---|---|
| | 21 | 22 | 23 | 24 |
| Intermediate layer | | | | |
| Thickness (mm) | 2.0 | 2.0 | 2.0 | 2.0 |
| Elasticity: | | | | |
| Maximum (Kgf/cm$^2$) | 13000 | 13000 | 13000 | 13000 |
| Minimum (Kgf/cm$^2$) | 6700 | 6700 | 6700 | 6700 |
| Loss tangent: | | | | |
| Maximum | 0.07 | 0.07 | 0.07 | 0.07 |
| Minimum | 0.05 | 0.05 | 0.05 | 0.05 |
| Solid core | | | | |
| Diameter (mm) | 36.7 | 36.7 | 36.7 | 36.7 |
| Spring constant (Kgf/mm) | 40 | 40 | 40 | 40 |
| Ball weight (g) | 45.5 | 45.5 | 45.5 | 45.5 |
| Flight distance (yards) | 225 | 224 | 210 | 212 |
| Spin amount (rpm) | | | | |
| W#1 | 2800 | 2700 | 3600 | 3500 |
| I#9 | 6000 | 5800 | 8200 | 7900 |
| Controllability | VP | VP | G | G |
| Shot feel | VP | VP | P | P |
| Flight performance | Ex. | Ex. | VP | VP |

As shown in Tables 26 and 27, the golf ball of Examples 17–24 show excellent in controllability and shot feel and longer flight distance. In Comparative Example 17, the spring constant of the solid core is smaller than the claimed range. In Comparative Example 18, the spring constant of the solid core is lager than the claimed range. In Comparative Example 19, the cover thickness and the intermediate layer thickness are thinner than the claimed range and the diameter of the solid core is larger than the claimed range. In Comparative Example 20, the cover thickness and the intermediate layer thickness are larger than the claimed range and the diameter of the solid core is smaller than the claimed range. Therefore, the golf balls of Comparative Examples 17–20 show shorter flight distance and poor in controllability and shot feel.

In Comparative Examples 21 and 22, the cover is only made from hard ionomer resin and therefore the resultant golf ball shows longer flight distance, but poor in controllability and shot feel, as shown in Table 29. Since Comparative Example 23 uses only soft ionomer resin as cover material and Comparative Example 24 uses large amount of the soft ionomer resin in the cover material, the maximum value of the loss tangent of the cover is larger than the claimed range and rebound characteristics reduce. Accordingly, the flight distance is shorter and the shot feel is also poor, as shown in Table 29.

(Second three piece solid golf ball)

Examples 25–32 and Comparative Example 25–34

Three piece solid golf balls which were used for Examples 25 to 32 and Comparative Examples 25 to 32 were obtained through the steps (1) to (4). Comparative Example 33 and 34 showed examples of two piece solid golf balls which were prepared through the steps (1), (3) and (4), in order to compare the three piece solid golf ball of Examples 25 to 32 with the two piece solid golf balls.

(1) Preparation of solid core

A solid core was prepared from a rubber composition containing high-cis polybutadiene rubber, zinc acrylate as co-crosslinking agent, zinc oxide as filler for weight adjuster and dicumyl peroxide. Vulcanization was conducted at 160° C. for 30 minutes in a mold. The resulting solid cores respectively had a spring constant of 14 Kgf/mm, 20 Kgf/mm, 25 Kgf/mm, 30 Kgf/mm, 35 Kgf/mm, 40 Kgf/mm, 45 Kgf/mm and 55 Kgf/mm by changing the formulating amount of zinc acrylate.

(2) Preparation of the resin composition for intermediate layer.

Resin composition for intermediate layer were prepared from the ingredients shown in Tables 30 to 34 in which the amount of the ingredient is indicated by parts by weight and the trade names are explained after Table 34. The composition was prepared by mixing in a twin-screw extruder with heating.

The resulting composition was subjected to the determination of elasticity modulus and loss tangent at −30° to +20° C., which was conducted as explained in Example 1–8. The results are shown in Tables 30 to 34, provided that the elasticity and loss tangent indicate both maximum value and minimum value.

TABLE 30

| | Examples | | | |
|---|---|---|---|---|
| | 25 | 26 | 27 | 28 |
| Ingredients for intermediate layer | | | | |
| Surlyn AD 8511 | 46 | 46 | 46 | 46 |
| Surlyn AD 8512 | 19 | 19 | 19 | 19 |
| Esprene 505A | 35 | 35 | 35 | 35 |
| Tackiroll | 1 | 1 | 1 | 1 |
| Titanium dioxide | 2 | 2 | 2 | 2 |
| Elasticity (E*) | | | | |
| Maximum value (Kgf/cm$^2$) | 5500 | 5500 | 5500 | 5500 |
| Minimum value (Kgf/cm$^2$) | 2800 | 2800 | 2800 | 2800 |
| Loss tangent | | | | |
| Maximum value | 0.059 | 0.059 | 0.059 | 0.059 |
| Minimum value | 0.056 | 0.056 | 0.056 | 0.056 |

TABLE 31

| | Examples | | | |
|---|---|---|---|---|
| | 29 | 30 | 31 | 32 |
| Ingredients for intermediate layer | | | | |
| Surlyn AD 8511 | 49 | 52.5 | 46 | 46 |
| Surlyn AD 8512 | 21 | 22.5 | 19 | 19 |
| Esprene 505A | 30 | 25 | 35 | 35 |
| Tackiroll | 1 | 1 | 1 | 1 |
| Titanium dioxide | 2 | 2 | 2 | 2 |
| Elasticity (E*) | | | | |
| Maximum value (Kgf/cm$^2$) | 6500 | 6500 | 5500 | 5500 |
| Minimum value (Kgf/cm$^2$) | 2900 | 3100 | 2800 | 2800 |
| Loss tangent | | | | |
| Maximum value | 0.061 | 0.058 | 0.059 | 0.05 |
| Minimum value | 0.057 | 0.049 | 0.056 | 0.05 |

TABLE 32

| | Comparative Examples | | | |
|---|---|---|---|---|
| | 25 | 26 | 27 | 28 |
| Ingredients for intermediate layer | | | | |
| Surlyn AD 8511 | 46 | 46 | 46 | 46 |
| Surlyn AD 8512 | 19 | 19 | 19 | 19 |
| Esprene 505A | 35 | 35 | 35 | 35 |
| Tackiroll | 1 | 1 | 1 | 1 |
| Titanium dioxide | 2 | 2 | 2 | 2 |
| Elasticity (E*) | | | | |
| Maximum value (Kgf/cm$^2$) | 5500 | 5500 | 5500 | 5500 |
| Minimum value (Kgf/cm$^2$) | 2800 | 2800 | 2800 | 2800 |
| Loss tangent | | | | |
| Maximum value | 0.059 | 0.059 | 0.059 | 0.059 |
| Minimum value | 0.056 | 0.056 | 0.056 | 0.056 |

TABLE 33

| | Comparative Examples | | | |
|---|---|---|---|---|
| | 29 | 30 | 31 | 32 |
| Ingredients for Intermediate layer | | | | |
| Hi-milan 1605 | 50 | 0 | 0 | 20 |
| Hi-milan 1706 | 50 | 0 | 0 | 0 |
| Surlyn AD 8511 | 0 | 70 | 0 | 0 |
| Surlyn AD 8522 | 0 | 30 | 0 | 0 |
| Hi-milan 1855 | 0 | 0 | 100 | 80 |
| Titanium dioxide | 2 | 2 | 2 | 2 |
| Elasticity (E*) | | | | |
| Maximum value (Kgf/cm$^2$) | 12500 | 9600 | 11400 | 11700 |
| Minimum value (Kgf/cm$^2$) | 6500 | 4000 | 2400 | 3100 |
| Loss tangent | | | | |
| Maximum value | 0.09 | 0.07 | 0.156 | 0.14 |
| Minimum value | 0.06 | 0.05 | 0.102 | 0.09 |

(3) Preparation of the cover composition.

Cover compositions were prepared from the ingredients shown in Tables 34–38, in which the amount of the ingredient is indicated by parts by weight. The composition was prepared by mixing in a twin-screw extruder with heating.

The resulting cover composition was subjected to the determination of elasticity modulus and loss tangent at −30° to +20° C., which was conducted as explained in the above intermediate layer. The results are shown in Tables 34 to 38, provided that the elasticity and loss tangent indicate both maximum value and minimum value.

TABLE 34

| | Examples | | | |
|---|---|---|---|---|
| | 25 | 26 | 27 | 28 |
| Ingredients for cover composition | | | | |
| Hi-milan 1605 | 50 | 50 | 50 | 50 |
| Hi-milan 1706 | 50 | 50 | 50 | 50 |
| Titanium dioxide | 2 | 2 | 2 | 2 |
| Elasticity (E*) | | | | |
| Maximum value (Kgf/cm$^2$) | 12500 | 12500 | 12500 | 12500 |
| Minimum value (Kgf/cm$^2$) | 6500 | 6500 | 6500 | 6500 |
| Loss tangent | | | | |
| Maximum value | 0.09 | 0.09 | 0.09 | 0.09 |
| Minimum value | 0.06 | 0.06 | 0.06 | 0.06 |

TABLE 35

| | Examples | | | |
|---|---|---|---|---|
| | 29 | 30 | 31 | 32 |
| Ingredients for cover composition | | | | |
| Hi-milan 1605 | 50 | 50 | 0 | 0 |
| Hi-milan 1706 | 50 | 50 | 50 | 50 |
| Hi-milan 1707 | 0 | 0 | 50 | 50 |
| Titanium dioxide | 2 | 2 | 2 | 2 |
| Elasticity (E*) | | | | |
| Maximum value (Kgf/cm$^2$) | 12500 | 12500 | 13000 | 13000 |
| Minimum value (Kgf/cm$^2$) | 6500 | 6500 | 6700 | 6700 |
| Loss tangent | | | | |
| Maximum value | 0.09 | 0.09 | 0.07 | 0.07 |
| Minimum value | 0.06 | 0.06 | 0.05 | 0.05 |

TABLE 36

| | Comparative Examples | | | |
|---|---|---|---|---|
| | 25 | 26 | 27 | 28 |
| Ingredients for cover composition | | | | |
| Hi-milan 1605 | 50 | 50 | 50 | 50 |
| Hi-milan 1706 | 50 | 50 | 50 | 50 |
| Titanium dioxide | 2 | 2 | 2 | 2 |
| Elasticity (E*) | | | | |
| Maximum value (Kgf/cm$^2$) | 12500 | 12500 | 12500 | 12500 |
| Minimum value (Kgf/cm$^2$) | 6500 | 6500 | 6500 | 6500 |
| Loss tangent | | | | |
| Maximum value | 0.09 | 0.09 | 0.09 | 0.09 |
| Minimum value | 0.06 | 0.06 | 0.06 | 0.06 |

TABLE 37

| | Comparative Examples | | | |
|---|---|---|---|---|
| | 29 | 30 | 31 | 32 |
| Ingredients for cover composition | | | | |
| Hi-milan 1605 | 50 | 50 | 50 | 50 |
| Hi-milan 1706 | 50 | 50 | 50 | 50 |
| Titanium dioxide | 2 | 2 | 2 | 2 |

TABLE 37-continued

|  | Comparative Examples | | | |
|---|---|---|---|---|
|  | 29 | 30 | 31 | 32 |
| Elasticity (E*) | | | | |
| Maximum value (Kgf/cm$^2$) | 12500 | 12500 | 12500 | 12500 |
| Minimum value (Kgf/cm$^2$) | 6500 | 6500 | 6500 | 6500 |
| Loss tangent | | | | |
| Maximum value | 0.09 | 0.09 | 0.09 | 0.09 |
| Minimum value | 0.06 | 0.06 | 0.06 | 0.06 |

TABLE 38

|  | Comparative Ex. | |
|---|---|---|
|  | 33 | 34 |
| Ingredients for cover composition | | |
| Hi-milan 1605 | 50 | 50 |
| Hi-milan 1706 | 50 | 50 |
| Titanium dioxide | 2 | 2 |
| Elasticity (E*) | | |
| Maximum value (Kgf/cm$^2$) | 12500 | 12500 |
| Minimum value (Kgf/cm$^2$) | 6500 | 6500 |
| Loss tangent | | |
| Maximum value | 0.09 | 0.09 |
| Minimum value | 0.06 | 0.06 |

(4) Preparation of golf ball

The resin composition for intermediate layer obtained above (2) was injection-molded on the solid core obtained in above (1) and then the cover composition obtained in the above (3) was injection-molded therein. It was subjected to seem buff and paint pretreatment. It was then coated two times with paint and marking was conducted thereon to form three piece solid golf ball having a diameter of 42.7 mm. In Comparative Examples 33 and 34, the cover composition of the above (3) was injection-molded on the solid core obtained in (1) and treated as generally described above to form a two piece solid golf ball having a diameter of 42.7 mm.

The resulting golf ball were subjected to the measurement of ball weight, flight distance, spin amount, shot feel and flight performance as explained in Example 1–8 and the results are shown in Tables 39 to 43. The flight distance in the second three piece solid golf ball also conducted to No. 9 iron (I#9; head speed=35 m/s) and the results are shown in Tables. Table 39 to 43 also indicate elasticity, loss tangent of the cover composition and intermediate layer, and spring constant of the thread wound core.

TABLE 39

|  | Examples | | | |
|---|---|---|---|---|
|  | 25 | 26 | 27 | 28 |
| Cover | | | | |
| Thickness (mm) | 2.0 | 2.0 | 2.0 | 2.0 |
| Elasticity: | | | | |
| Maximum (Kgf/cm$^2$) | 12500 | 12500 | 12500 | 12500 |
| Minimum (Kgf/cm$^2$) | 6500 | 6500 | 6500 | 6500 |

TABLE 39-continued

|  | Examples | | | |
|---|---|---|---|---|
|  | 25 | 26 | 27 | 28 |
| Loss tangent: | | | | |
| Maximum | 0.09 | 0.09 | 0.09 | 0.09 |
| Minimum | 0.06 | 0.06 | 0.06 | 0.06 |
| Intermediate layer | | | | |
| Thickness (mm) | 2.0 | 2.0 | 2.0 | 1.5 |
| Elasticity: | | | | |
| Maximum (Kgf/cm$^2$) | 5500 | 5500 | 5500 | 5500 |
| Minimum (Kgf/cm$^2$) | 2800 | 2800 | 2800 | 2800 |
| Loss tangent: | | | | |
| Maximum | 0.059 | 0.059 | 0.059 | 0.059 |
| Minimum | 0.056 | 0.056 | 0.056 | 0.056 |
| Solid core | | | | |
| Diameter (mm) | 34.7 | 34.7 | 34.7 | 34.7 |
| Spring constant (Kgf/mm) | 20 | 30 | 40 | 30 |
| Ball weight (g) | 45.4 | 45.4 | 45.4 | 45.4 |
| Flight distance (yards) | | | | |
| W#1 (45 m/s) | 225 | 226 | 227 | 226 |
| I#9 (35 m/s) | 143 | 143 | 144 | 143 |
| Spin amount (rpm) | | | | |
| W#1 | 2300 | 2400 | 2500 | 2400 |
| I#9 | 5050 | 5150 | 5250 | 5200 |
| Shot feel | Ex. | Ex. | G | G |
| Flight performance | G | G | G | G |

TABLE 40

|  | Examples | | | |
|---|---|---|---|---|
|  | 29 | 30 | 31 | 32 |
| Cover | | | | |
| Thickness (mm) | 2.0 | 2.0 | 2.0 | 2.0 |
| Elasticity: | | | | |
| Maximum (Kgf/cm$^2$) | 12500 | 12500 | 13000 | 13000 |
| Minimum (Kgf/cm$^2$) | 6500 | 6500 | 6700 | 6700 |
| Loss tangent: | | | | |
| Maximum | 0.09 | 0.09 | 0.07 | 0.07 |
| Minimum | 0.06 | 0.06 | 0.05 | 0.05 |
| Intermediate layer | | | | |
| Thickness (mm) | 2.0 | 2.0 | 2.0 | 2.0 |
| Elasticity: | | | | |
| Maximum (Kgf/cm$^2$) | 6000 | 6500 | 5500 | 5500 |
| Minimum (Kgf/cm$^2$) | 2900 | 3100 | 2800 | 2800 |
| Loss tangent: | | | | |
| Maximum | 0.061 | 0.058 | 0.059 | 0.059 |
| Minimum | 0.057 | 0.049 | 0.056 | 0.056 |
| Solid core | | | | |
| Diameter (mm) | 34.7 | 34.7 | 34.7 | 34.7 |
| Spring constant (Kgf/mm) | 30 | 30 | 25 | 35 |
| Ball weight (g) | 45.4 | 45.4 | 45.4 | 45.4 |
| Flight distance (yards) | | | | |
| W#1 (45 m/s) | 228 | 229 | 227 | 228 |
| I#9 (35 m/s) | 145 | 146 | 143 | 145 |
| Spin amount (rpm) | | | | |
| W#1 | 2400 | 2300 | 2350 | 2400 |
| I#9 | 5200 | 5100 | 5150 | 5200 |

TABLE 40-continued

| | Examples | | | |
|---|---|---|---|---|
| | 29 | 30 | 31 | 32 |
| Shot feel | G | G | Ex. | Ex. |
| Flight performance | Ex. | Ex. | G | Ex. |

TABLE 41

| | Comparative Examples | | | |
|---|---|---|---|---|
| | 25 | 26 | 27 | 28 |
| Cover | | | | |
| Thickness (mm) | 2.0 | 2.0 | 0.9 | 3.3 |
| Elasticity: | | | | |
| Maximum (Kgf/cm$^2$) | 12500 | 12500 | 12500 | 12500 |
| Minimum (Kgf/cm$^2$) | 6500 | 6500 | 6500 | 6500 |
| Loss tangent: | | | | |
| Maximum | 0.09 | 0.09 | 0.09 | 0.09 |
| Minimum | 0.06 | 0.06 | 0.06 | 0.06 |
| Intermediate layer | | | | |
| Thickness (mm) | 2.0 | 2.0 | 0.9 | 3.3 |
| Elasticity: | | | | |
| Maximum (Kgf/cm$^2$) | 5500 | 5500 | 5500 | 5500 |
| Minimum (Kgf/cm$^2$) | 2800 | 2800 | 2800 | 2800 |
| Loss tangent: | | | | |
| Maximum | 0.059 | 0.059 | 0.059 | 0.059 |
| Minimum | 0.056 | 0.056 | 0.056 | 0.056 |
| Solid core | | | | |
| Diameter (mm) | 34.7 | 34.7 | 39.1 | 29.5 |
| Spring constant (Kgf/mm) | 14 | 55 | 30 | 30 |
| Ball weight (g) | 45.4 | 45.4 | 45.4 | 45.4 |
| Flight distance (yards) | | | | |
| W#1 (45 m/s) | 217 | 219 | 217 | 218 |
| I#9 (35 m/s) | 135 | 138 | 137 | 140 |
| Spin amount (rpm) | | | | |
| W#1 | 2300 | 3000 | 2900 | 2700 |
| I#9 | 5000 | 6700 | 6100 | 5600 |
| Shot feel | G | P | G | P |
| Flight performance | P | G | A | G |

TABLE 42

| | Comparative Examples | | | |
|---|---|---|---|---|
| | 29 | 30 | 31 | 32 |
| Cover | | | | |
| Thickness (mm) | 2.0 | 2.0 | 2.0 | 2.0 |
| Elasticity: | | | | |
| Maximum (Kgf/cm$^2$) | 12500 | 12500 | 12500 | 12500 |
| Minimum (Kgf/cm$^2$) | 6500 | 6500 | 6500 | 6500 |
| Loss tangent: | | | | |
| Maximum | 0.09 | 0.09 | 0.09 | 0.09 |
| Minimum | 0.06 | 0.06 | 0.06 | 0.06 |
| Intermediate layer | | | | |
| Thickness (mm) | 2.0 | 2.0 | 2.0 | 2.0 |
| Elasticity: | | | | |
| Maximum (Kgf/cm$^2$) | 12500 | 9600 | 11400 | 11700 |
| Minimum (Kgf/cm$^2$) | 6500 | 4000 | 2400 | 3100 |

TABLE 42-continued

| | Comparative Examples | | | |
|---|---|---|---|---|
| | 29 | 30 | 31 | 32 |
| Loss tangent: | | | | |
| Maximum | 0.09 | 0.07 | 0.156 | 0.14 |
| Minimum | 0.06 | 0.05 | 0.102 | 0.09 |
| Solid core | | | | |
| Diameter (mm) | 34.7 | 34.7 | 34.7 | 34.7 |
| Spring constant (Kgf/mm) | 30 | 30 | 30 | 30 |
| Ball weight (g) | 45.4 | 45.4 | 45.4 | 45.4 |
| Flight distance (yards) | | | | |
| W#1 (45 m/s) | 224 | 226 | 217 | 220 |
| I#9 (35 m/s) | 143 | 143 | 135 | 137 |
| Spin amount (rpm) | | | | |
| W#1 | 2800 | 2900 | 2400 | 2500 |
| I#9 | 5800 | 6000 | 5700 | 5800 |
| Shot feel | VP | VP | G | G |
| Flight performance | G | G | P | A |

TABLE 43

| | Comparative Ex. | |
|---|---|---|
| | 33 | 34 |
| Cover | | |
| Thickness (mm) | 2.3 | 2.3 |
| Elasticity: | | |
| Maximum (Kgf/cm$^2$) | 12500 | 12500 |
| Minimum (Kgf/cm$^2$) | 6500 | 6500 |
| Loss tangent: | | |
| Maximum | 0.09 | 0.09 |
| Minimum | 0.06 | 0.06 |
| Solid core | | |
| Diameter (mm) | 38.1 | 38.1 |
| Spring constant (Kgf/mm) | 35 | 45 |
| Ball weight (g) | 45.4 | 45.4 |
| Flight distance (yards) | | |
| W#1 (45 m/s) | 220 | 221 |
| I#9 (35 m/s) | 138 | 137 |
| Spin amount (rpm) | | |
| W#1 | 2800 | 2900 |
| I#9 | 5800 | 6000 |
| Shot feel | P | VP |
| Flight performance | A | A |

As shown in Tables 39 and 40, the golf ball of Examples 25–32 show excellent in controllability and shot feel and longer flight distance, in comparison with conventional two piece solid golf balls disclosed in Comparative Example 33 and 34.

In Comparative Example 25, the spring constant of the solid core is smaller than the claimed range. In Comparative Example 26, the spring constant of the solid core is lager than the claimed range. In Comparative Example 27, the cover thickness and the intermediate layer thickness are thinner than the claimed range and the diameter of the solid core is larger than the claimed range. In Comparative Example 28, the cover thickness and the intermediate layer thickness are larger than the claimed range and the diameter of the solid core is smaller than the claimed range. Therefore, the golf balls of Comparative Examples 25–28 show shorter flight distance and poor in controllability and shot feel, as shown in Table 41.

In Comparative Examples 29 and 30, the cover is only made from hard ionomer resin and therefore the resultant golf ball shows longer flight distance, but poor in shot feel, as shown in Table 42. Since Comparative Example 31 uses only soft ionomer resin as cover material and Comparative Example 32 uses large amount of the soft ionomer resin in the cover material, the maximum value of the loss tangent of the cover is larger than the claimed range and rebound characteristics reduce. Accordingly, the flight distance is shorter and the shot feel is also poor, as shown in Table 42. As shown in Table 43, the two piece solid golf ball show considerably flight distance, but show shorter flight distance of the three piece solid golf ball of Example 25–28 and yet show poor shot feel.

What is claimed is:

1. A golf ball comprising a core and a cover present on the core, an intermediate layer optionally being present between the core and the cover, wherein at least one layer of the cover or the intermediate layer has a thickness of 1 to 3 mm and is formed from a composition having an elasticity modulus (E*) at $-30°$ to $+20°$ C. of 1000 to 9,000 Kgf/cm$^2$ and a loss tangent at $-30°$ to $+20°$ C. of 0.02 to 0.1, the core, whether solid core or thread wound core, has a spring constant at compression deformation of 15 to 60 Kgf/mm.

2. A thread wound golf ball comprising a thread wound core and a cover covering the thread wound core, wherein the cover has a thickness of 1 to 3 mm and is formed from a cover composition having an elasticity modulus (E*) at $-30°$ to $+20°$ C. of 1000 to 9,000 Kgf/cm$^2$ and a loss tangent at $-30°$ to $+20°$ C. of 0.02 to 0.09, the thread wound core has a spring constant at compression deformation of 15 to 60 Kgf/mm.

3. The thread wound golf ball according to claim 2 wherein the cover composition comprises a mixture of an ionomer resin and a diene rubber.

4. A two piece solid golf ball comprising a solid cover a cover covering the solid core, wherein the cover has a thickness of 1 to 3 mm and is formed from a cover composition having an elasticity modulus (E*) at $-30°$ to $+20°$ C. of 1000 to 9,000 Kgf/cm$^2$ and a loss tangent at $-30°$ to $+20°$ C. of 0.02 to 0.1, the solid core has a diameter of 36.7 to 40.7 mm and a spring constant at compression deformation of 20 to 60 Kgf/mm.

5. The two piece solid golf ball according to claim 4 wherein said cover composition comprises a mixture of an ionomer resin and a diene rubber.

6. The two piece solid golf ball according to claim 4 wherein said solid core is formed by vulcanizing a rubber composition comprising butadiene rubber, zinc acrylate and an organic peroxide.

7. A three piece solid golf ball comprising a solid core, an intermediate layer formed on the solid core and a cover covering the intermediate layer, wherein the cover comprises a mixture of an ionomer resin and a diene rubber, has a thickness of 1 to 3 mm, and is formed from a cover composition having an elasticity modulus (E*) at $-30°$ to $+20°$ C. of 1000 to 9,000 Kgf/cm$^2$ and a loss tangent at $-30°$ to $+20°$ C. of 0.02 to 0.1;

the intermediate layer has a thickness of 1 to 3 mm and is formed from a resin composition having an elasticity modulus (E*) at $-30°$ to $+20°$ C. of 5,000 to 20,000 kgf/cm$^2$ and a loss tangent at $-30°$ to $+20°$ C. of 0.15 or less, the minimum value of the elasticity modulus of the intermediate layer being larger than that of the cover; and the solid core has a diameter of 30.7 to 38.7 mm and a spring constant at compression deformation of 20 to 55 Kgf/mm.

8. The three piece solid golf ball according to claim 7, wherein the intermediate layer is formed from an ionomer resin.

9. The three piece solid golf ball according to claim 7, wherein said solid core is formed by vulcanizing a rubber composition comprising butadiene rubber, zinc acrylate and an organic peroxide.

10. The three piece solid golf ball according to claim 7, wherein the mixture of ionomer resin and diene rubber has a mixing weight ratio range of ionomer resin to diene rubber of 90:10 to 40:60.

11. The three piece solid golf ball according to claim 7, wherein the solid core has a spring constant of 22 to 50 Kgf/mm.

12. The three piece solid golf ball according to claim 7, wherein the intermediate layer is formed from an ionomer resin; the solid core is formed by vulcanizing a rubber composition comprising butadiene rubber, zinc acrylate and an organic peroxide; and the mixture of ionomer resin and diene rubber has a mixing weight ratio range of ionomer resin to diene rubber of 90:10 to 40:60.

13. A three piece solid golf ball comprising a solid core, an intermediate layer formed on the solid core and a cover covering the intermediate layer, wherein the cover has a thickness of 1 to 3 mm and is formed from a resin composition having an elasticity modulus (E*) at $-30°$ to $+20°$ C. of 5,000 to 20,000 Kgf/cm$^2$ and a loss tangent at $-30°$ to $+20°$ C. of 0.15 or less, the intermediate layer has a thickness of 1 to 3 mm and is formed from a intermediate layer composition having an elasticity modulus (E*) at $-30°$ to $+20°$ C. of 1000 to 9,000 Kgf/cm$^2$ and a loss tangent at $-30°$ to $+20°$ C. of 0.02 to 0.1, the minimum value of the elasticity modulus of the intermediate layer being smaller than that of the cover, the solid core has a diameter of 30.7 to 38.7 mm and a spring constant at compression deformation of 15 to 50 Kgf/mm.

14. The three piece solid golf ball according to claim 13 wherein the cover composition is formed from an ionomer resin and the intermediate layer is formed from a mixture of an ionomer resin and a diene rubber and the intermediate layer.

15. The three piece solid golf ball according to claim 13 wherein said solid core is formed by vulcanizing a rubber composition comprising butadiene rubber, zinc acrylate and an organic peroxide.

* * * * *